United States Patent [19]
Serizawa et al.

[11] Patent Number: 5,512,929
[45] Date of Patent: Apr. 30, 1996

[54] IMAGE FORMING APPARATUS WITH FIXER TEMPERATURE CONTROL

[75] Inventors: Yoji Serizawa, Yokohama; Akio Noguchi, Ebina; Yukihide Ushio; Shimpei Matsuo, both of Tokyo; Kazuro Yamada, Machida; Seiji Uchiyama, Tokyo; Makoto Takeuchi, Yokohama; Koichi Suwa, Yokohama; Koichi Hiroshima, Yokohama; Shinichi Tsukida, Okegawa; Manabu Takano, Machida; Masahiro Goto, Yokohama; Takahiro Inoue, Yokohama; Hiromichi Yamada, Yokohama; Junichi Kato, Sagamihara; Masaki Ojima, Yokohama, all of Japan

[73] Assignee: Canon Kabushiki Kaisha, Tokyo, Japan

[21] Appl. No.: 487,583

[22] Filed: Jun. 7, 1995

Related U.S. Application Data

[60] Continuation of Ser. No. 357,294, Dec. 13, 1994, abandoned, which is a division of Ser. No. 191,548, Feb. 4, 1994, Pat. No. 5,412,480, which is a continuation of Ser. No. 974,503, Nov. 12, 1992, abandoned, which is a division of Ser. No. 703,298, May 20, 1991, Pat. No. 5,274,402.

[30] Foreign Application Priority Data

| May 21, 1990 | [JP] | Japan | 2-129183 |
| May 21, 1990 | [JP] | Japan | 2-129184 |
| May 21, 1990 | [JP] | Japan | 2-191022 |

[51] Int. Cl.$^6$ ................................. H04N 1/21
[52] U.S. Cl. .......................... 347/153; 347/156
[58] Field of Search ................... 347/144, 153, 347/156; 358/296, 298, 300, 302

[56] References Cited

U.S. PATENT DOCUMENTS

| 4,706,127 | 11/1987 | Nobuta | 358/296 |
| 4,933,772 | 6/1990 | Ikenoue et al. . | |
| 5,146,554 | 9/1992 | Statt | 395/150 |

FOREIGN PATENT DOCUMENTS

| 0343827 | 11/1989 | European Pat. Off. . |
| 0362791 | 4/1990 | European Pat. Off. . |
| 57-211168 | 12/1982 | Japan . |
| 60-18371 | 1/1985 | Japan . |

*Primary Examiner*—Mark J. Reinhart
*Attorney, Agent, or Firm*—Fitzpatrick, Cella, Harper & Scinto

[57] ABSTRACT

An image forming apparatus includes a feeder means and a recorder. The feeder feeds a sheet of recording paper to a predetermined position in response to a spare paper feed signal instructing the feeding of the sheet of recording paper to the predetermined position preliminarily, and then feeds the sheet of recording paper being stopped at the predetermined position again in response to a record request signal. The recorder records an image on the sheet of recording paper fed by the feeder means through an electrophotographic process. The recorder means starts preparation to execute the electrophotographic process upon receiving the spare paper feed signal. As a result throughput is increased without causing other problems.

21 Claims, 23 Drawing Sheets

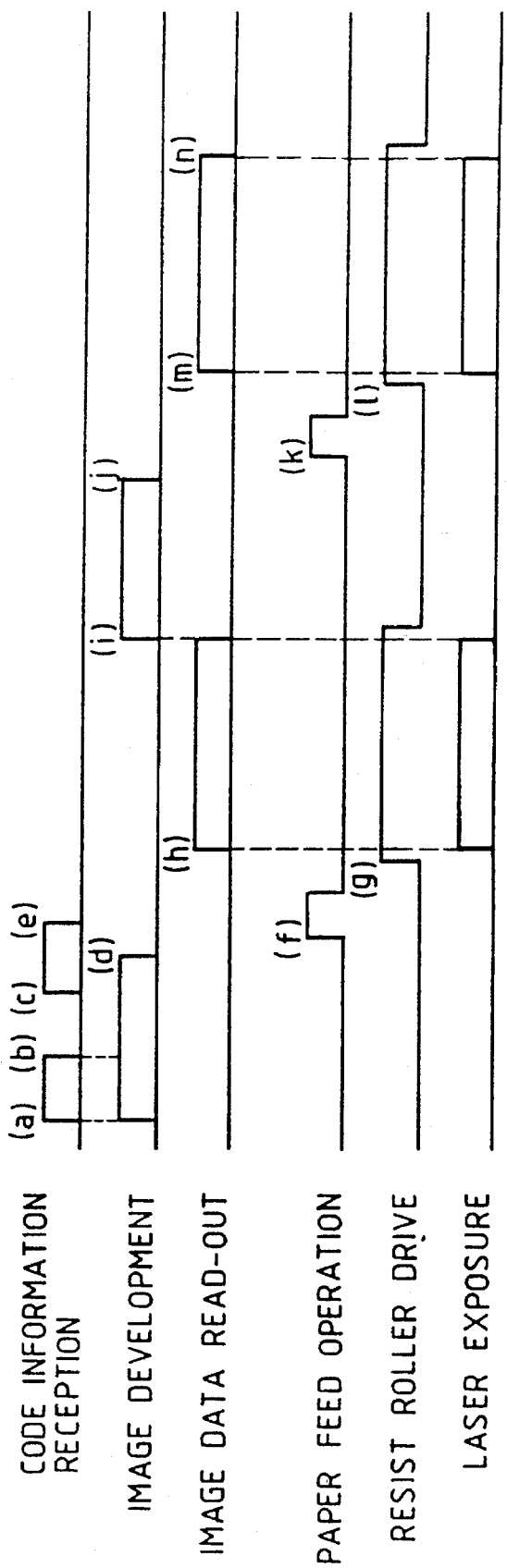

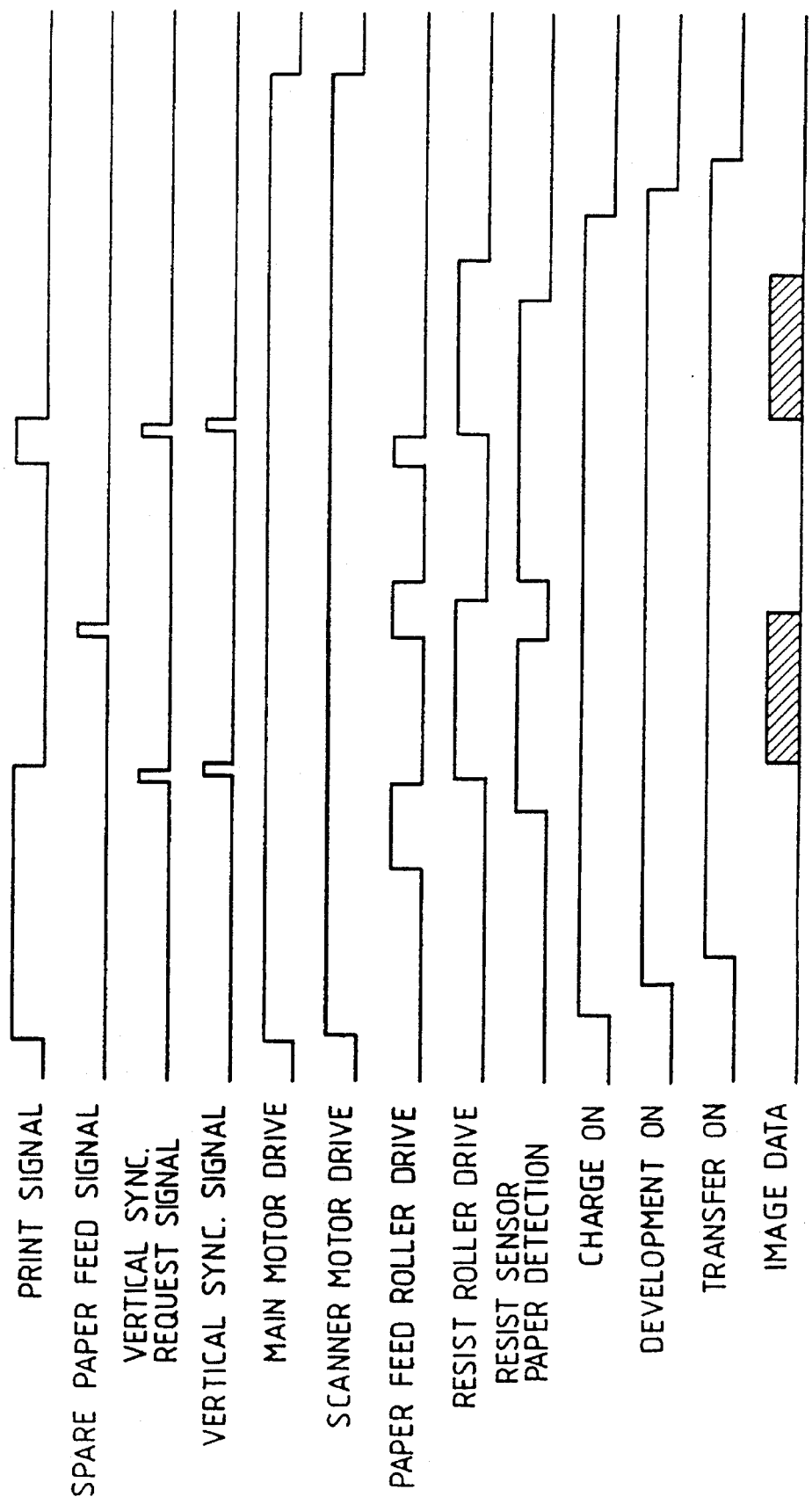

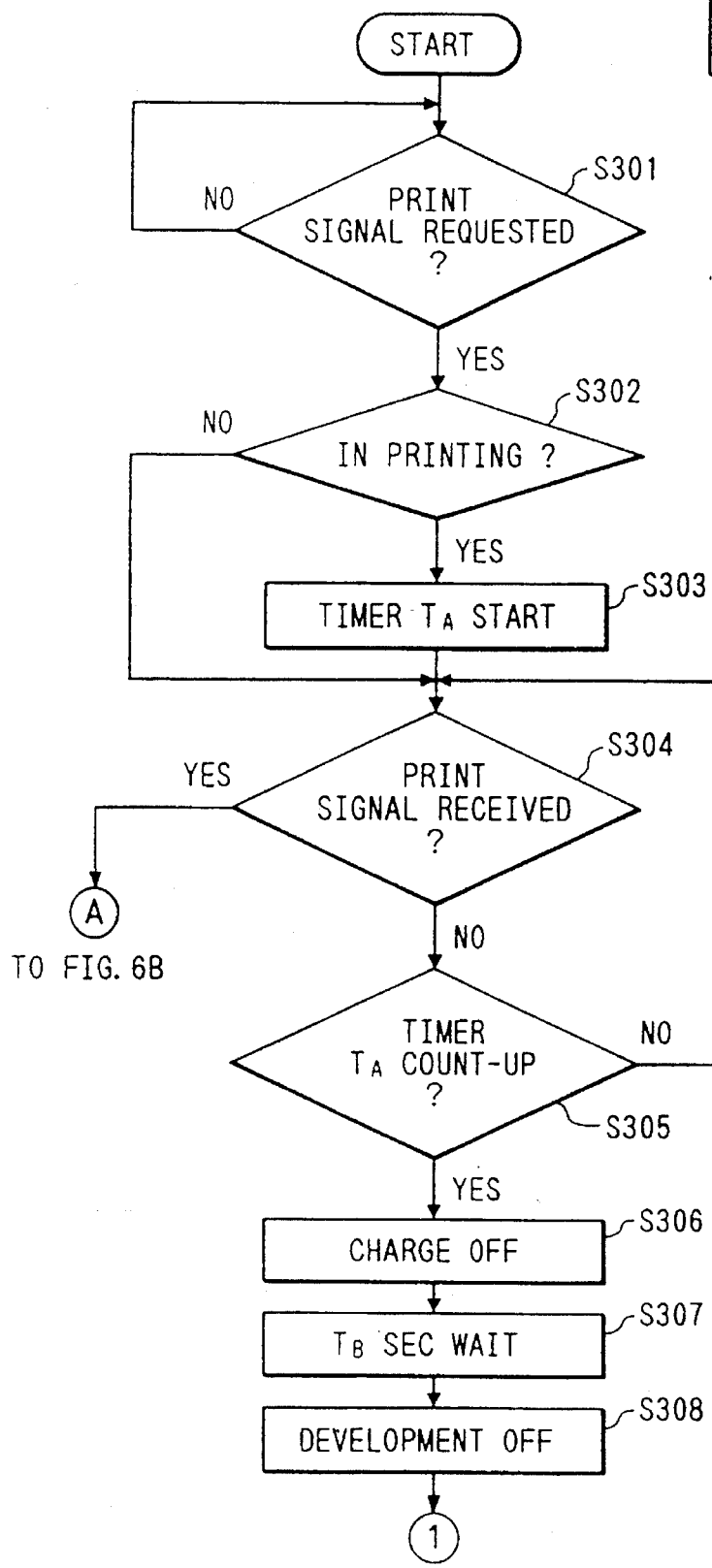

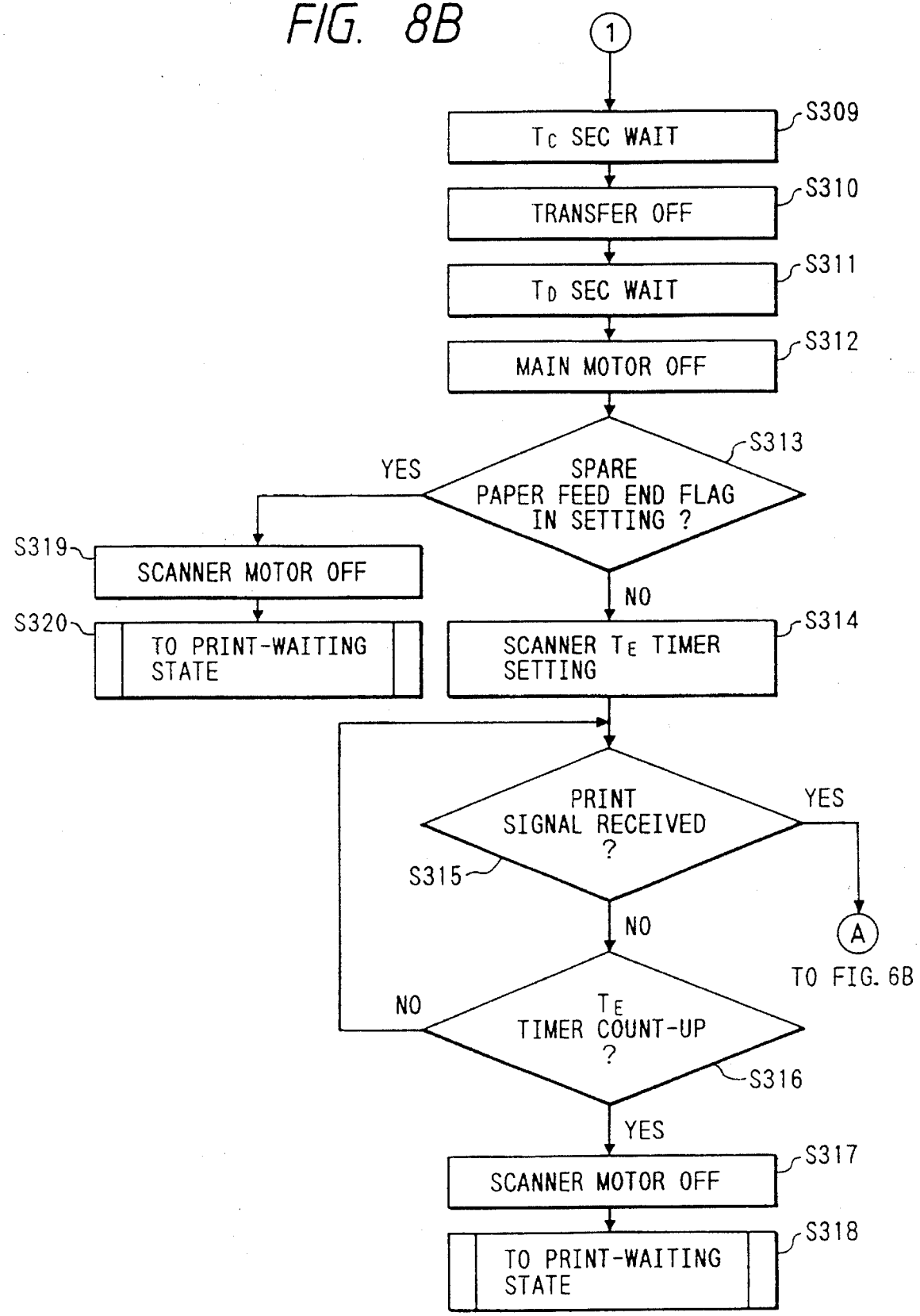

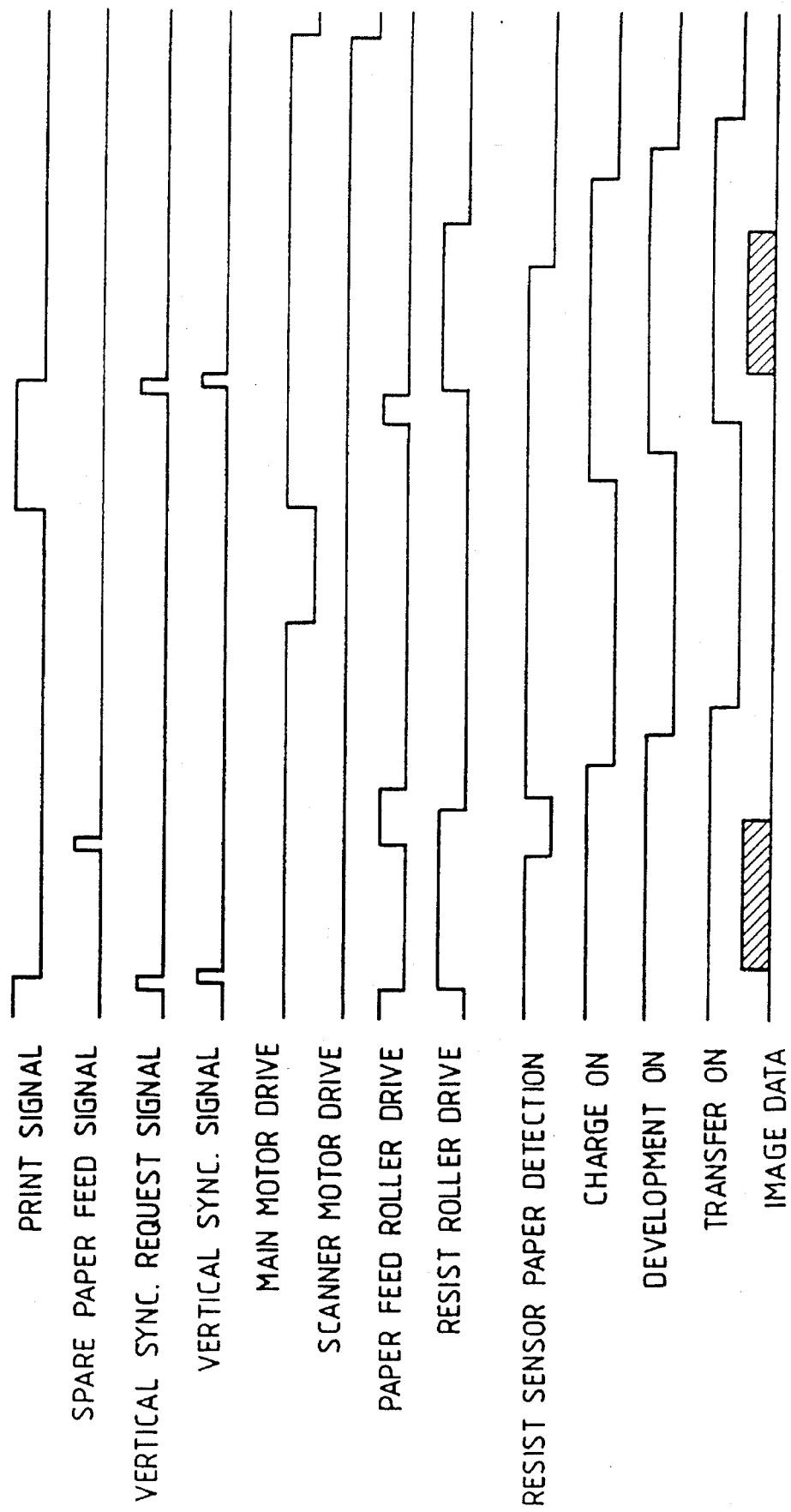

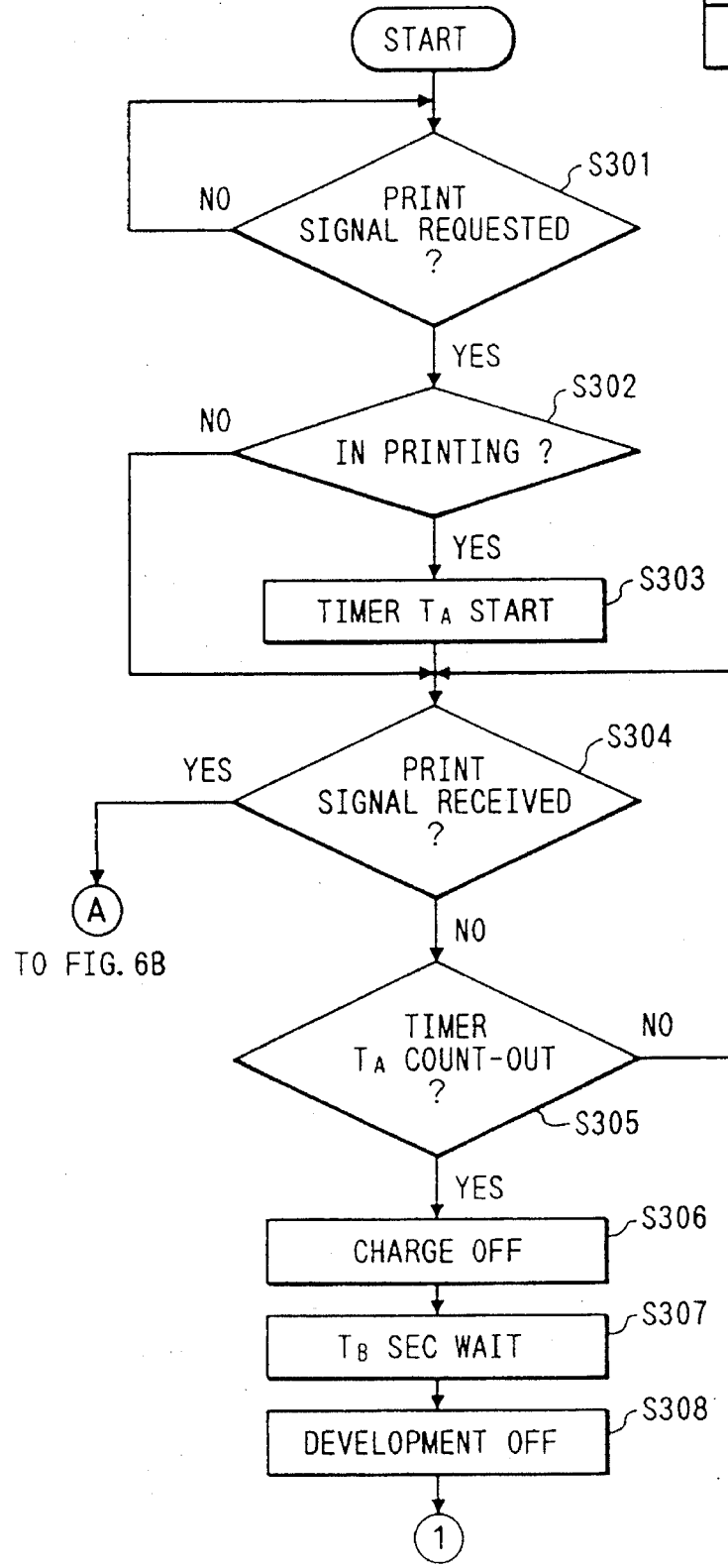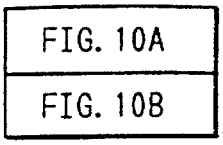

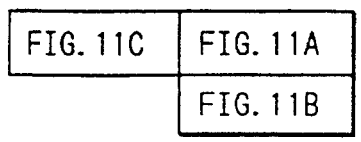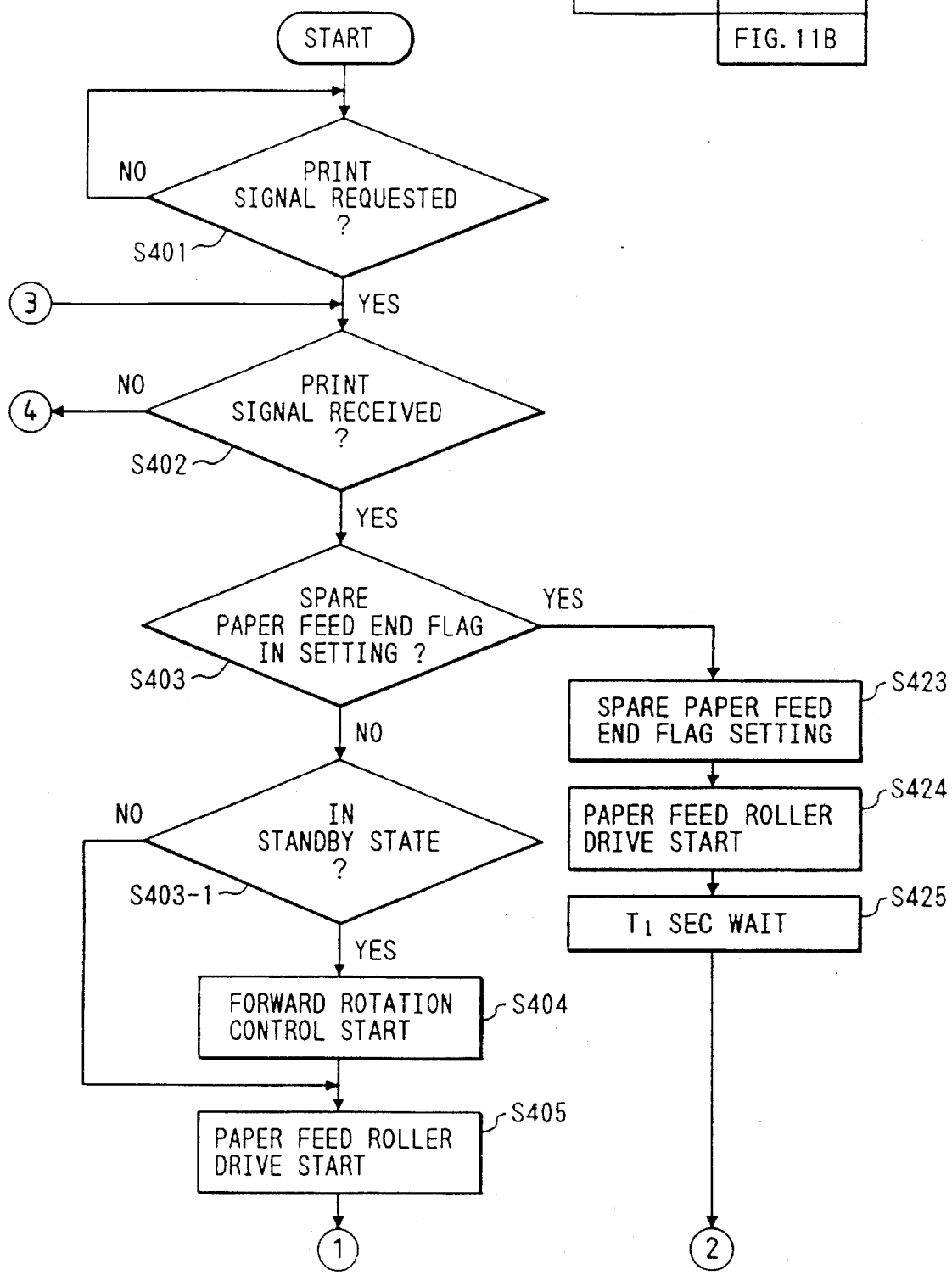

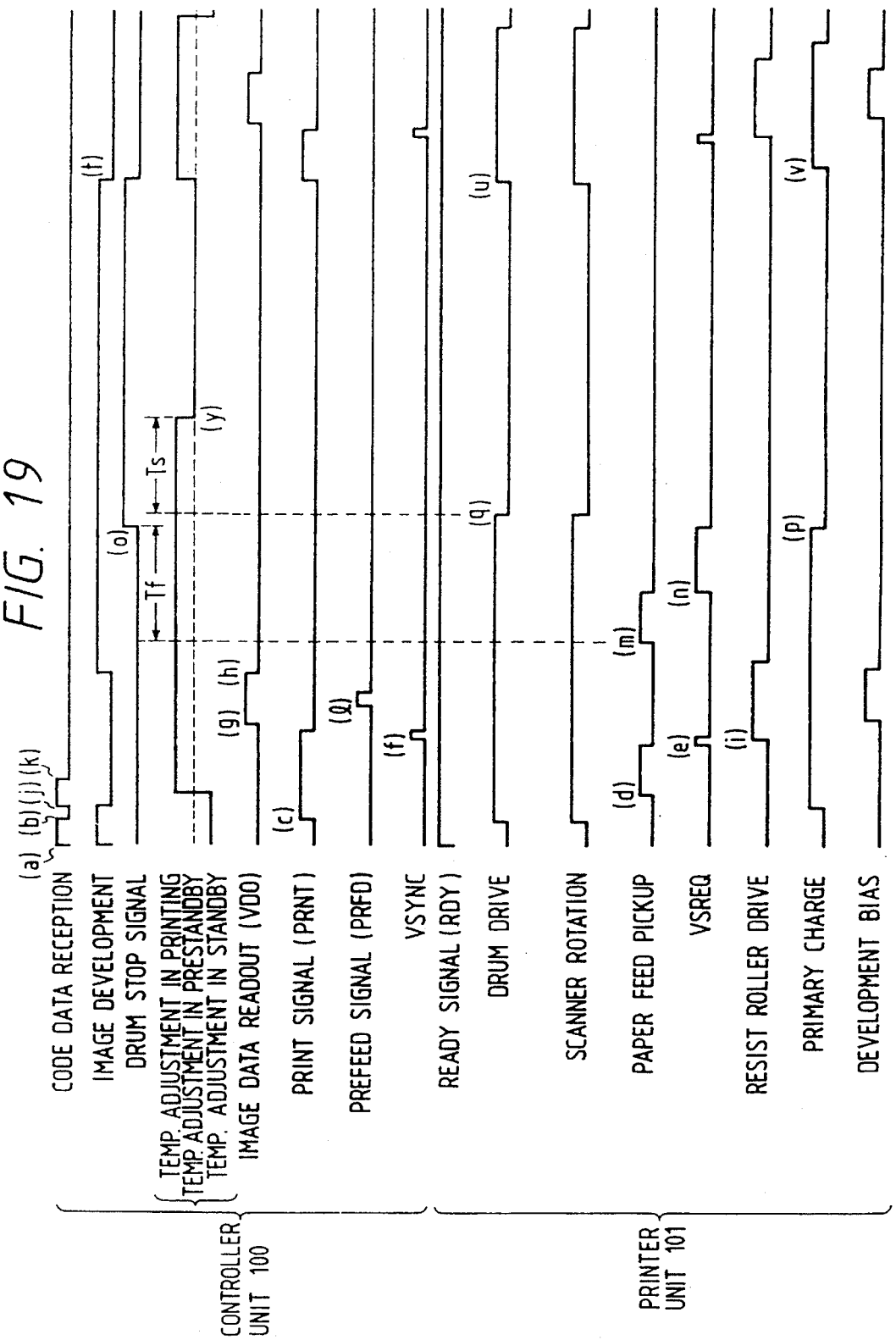

IMAGE FORMING APPARATUS WITH FIXER TEMPERATURE CONTROL

This application is a continuation of application Ser. No. 08/357,294, filed Dec. 13, 1994, now abandoned, which is a division of application Ser. No. 08/191,548, filed Feb. 4, 1994, now U.S. Pat. No. 5,412,480, issued May 2, 1995, which is a continuation of application Ser. No. 07/974,503, filed Nov. 12, 1992, now abandoned, which is a division of application Ser. No. 07/703,298, filed May 20, 1991, now U.S. Pat. No. 5,274,402, issued Dec. 28, 1993.

BACKGROUND OF THE INVENTION

1. Field of the Invention

The present invention relates to an image forming apparatus for converting character or figure information into bit mapped information (pixel information) and forming an image based on the converted information.

Also, the present invention relates to an image recording apparatus such as a laser printer, for example, which has a spare paper feeding function.

In this specification, the term "spare paper feeding function" means a function of starting to feed a spare sheet of recording paper prior to reception of a signal indicating the start of recording.

2. Related Background Art

Electrophotographic printers are able to produce prints with high resolution and high quality. Therefore, various types of etectrophotographic printers such as laser printers, LED printers and liquid crystal printers have recently been developed and become widespread. By utilizing a high quality feature, those printers are used to output-complex figures and pictures.

A controller (e.g., a postscript controller) for processing complex image data covering one page of printed sheet requires an image memory (hereinafter referred to as a page memory) with a capacity corresponding to one page at a minimum. To print a sheet of A4 size with resolution of 300 dpi, for example, a page memory having a capacity as large as 1 Mbyte is required.

There is a large amount of image information to be processed by such high quality printers. Accordingly, image data to be handled by memory devices of computers and other systems for image processing equipment are often in the form of coded data or programmed data rather than raw raster image data.

The performance of page printers is determined by how fast coded image information of one page is converted into raster image information of one page before printing.

One example of a control form in page printers of prior art is as follows.

FIG. 1 shows a section of a laser beam printer as a typical one of page printer. FIG. 2 is a schematic block diagram of a control circuit in the typical laser beam printer. In FIG. 2, reference numeral 25 represents an information processing apparatus (such as a personal computer or work station, for example) external to the laser printer. Reference numeral 27 denotes an external interface (such as Centronics or RS232C, for example) which delivers coded image information (such as ASCII code, for example, hereinafter referred to as coded information) to the laser printer. The coded information is received by an interface circuit 18 in the laser printer. A microprocessor 17 receives the coded information, received by the interface circuit 18, through an internal bus 28. The internal bus 28 comprises a collection of a data bus, an address bus and a control bus. The microprocessor 17 is operated in accordance with a control program stored in a memory 21. The memory 21 is a non-volatile ROM.

The microprocessor 17 processes the coded information obtained through the interface circuit 18 to some extent and stores it in a memory 19. Thus, the memory 19 is a RAM for storing the coded information. The microprocessor 17 sequentially stores the coded information externally received into the RAM 19 and, at the same time, converts the coded information into image information representing a dot image, followed by storing it in a RAM 20. Thus, the RAM 20 is an image data store memory (bit map memory). Denoted by 22 is a DMA controller serving to read out the data stored in the RAM 20 and deliver the read data to a raster conversion circuit 24.

The DMA controller 22 may exclusively use the internal bus 28 independently of the microprocessor 17. When it is detected that the image data stored in the RAM 20 has reached an amount corresponding to one page (i.e., all the coded data of one page have been converted into the image data), the microprocessor 17 sets the DMA controller 22 in an active state. The DMA controller 22 exclusively uses the internal bus alternately with the microprocessor 17. Upon a request from the raster conversion circuit 24, the DMA controller 22 sequentially reads the image data out of the RAM 20 and delivers the read data to the raster conversion circuit 24. The raster conversion circuit 24 converts the parallel image data received from the DMA controller 22 into serial image data. Then, in synchronism with a horizontal synch signal, the serial image data are outputted to a laser driver (not shown) in a mechanical control unit 26 for modulating a laser beam.

Mechanical control in the laser printer will be described below with reference to FIG. 1. In FIG. 1, reference numeral 1 represents a body of the laser printer. After developing the coded data of one page and storing the image data in the memory 20, the microprocessor 17 rotates a feed motor (not shown) through an I/O driver 23. This starts rotating a photosensitive drum 2, a primary charge roller 5, a development roller 7, a transfer roller 10, a fixer roller 15A, and a discharge roller 16. The feed motor is controlled in its rotation by the mechanical control unit 26.

Reference numeral 3 represents a laser scanner which houses a laser scan mirror, a laser scan motor, a laser emitting element, and a laser drive circuit therein. The I/O driver 23 serves to rotate not only the feed motor but also the laser scan motor within the laser scanner 3. The I/O driver 23 also sequentially applies high voltage biases to the primary charge roller 50 the development roller 7 and the transfer roller 10. Further, the I/O driver 23 turns on a clutch mounted on a paper feed roller 12 to feed sheets of transfer material 13 such as paper stacked in a paper cassette 14 one by one. The sheet of transfer material 13 thus fed is once stopped by a resist roller 11. Then, the mechanical control unit 26 informs the I/O driver 23 that the fed sheet of transfer material 13 has reached the resist roller 11. At the time the sheet of transfer material 13 is stopped by the resist roller 11, the microprocessor 17 sets the DMA controller 22 in an active state. Subsequently, the serial image data are delivered from the raster conversion circuit 24. The delivered serial image data are inputted to the laser scanner 3 so that a laser beam modulated by the image data irradiates the photosensitive drum 2. This builds a latent image on the surface of a photoreceptor, the latent image being visualized into a toner image by a development unit 6.

The sheet of transfer material 13 once stopped by the resist roller 11 starts to be fed again by the resist roller 11, and the toner image is transferred to the sheet of transfer material 13 by the transfer roller 10. The sheet of transfer material 13 with toner deposited thereon is fixed under heating by the fixer roller 15A and, thereafter, it is discharged by the discharge roller 16 externally of the printer body. The remaining toner that has not been transferred to the sheet of transfer material 13 by the transfer roller 10 is collected by a cleaner 9.

While the fixer roller 15A is generally adjusted to a predetermined temperature, i.e., a temperature for printing (during the fixing operation), it may be also adjusted to a lower setting temperature, i.e., a standby temperature, other than that printing temperature. This aims to prevent a temperature rise in the printer, reduce electric power consumption, etc.

In this way, the coded information given from the external information processing apparatus is printed as image information on the sheet of paper.

When printing data in an amount corresponding to plural pages, the printing is performed in accordance with the timed relationship shown in FIG. 3. Referring to FIG. 3, the microprocessor 17 starts reception of the coded information at the timing (a). Simultaneously, the microprocessor 17 starts the image development and stores the image data in the memory 20. After terminating the reception of the coded data for the first page at the timing (b), the microprocessor 17 successively starts reception of the coded information at the timing (c). If image development for the first page is completed at the timing (d), the feed motor is rotated at the timing (f) to perform the paper feeding operation. Then, the resist roller 11 is driven at the timing (g) and reading of the image data by the DMA controller 22 is started at the timing (h). Simultaneously, the serial image data are produced by the raster conversion circuit 24 and laser exposure is started at the timing (h). Afterward, the laser exposure for the first page is completed at the timing (i). Since the reception of the coded information for the second page has already been completed at the timing (e), the image development for the second page is also started at the timing (i). After that, the second page is printed following the same sequence as the first page.

As will be seen from FIG. 3, the periods of (a) to (d) and (i) to (j) of the image development are completely independent of the period of (h) to (i) for reading the image data (also the period for the laser exposure), with no overlapping periods therebetween. This is because the image memory has a capacity corresponding to only one page.

With the foregoing control method, no access is made to the image memory 20 during the period of (f) to (h) (or the period of (k) to (m)). Accordingly, the throughput (the number of sheets printed per unit time) is lowered in laser beam printers of the type that the distance between the paper feed roller 12 and the resist roller 11 is very long. Providing the image memory with the capacity corresponding to two pages makes it possible to overlap the period of the image development and the period of reading the image data with each other, and thus increase the throughput. In this case, however, the memory cost is doubled.

To solve the aforementioned disadvantage, the following control method could be envisaged.

With this method, at the time the microprocessor 17 receives the coded information of one page from the external information processing apparatus 25 such as a host computer, the feeding operation for the sheet of transfer material 13 such as paper is started and then stopped at a predetermined position in a standby state. Afterward, at the time the microprocessor 17 has completely finished the development of the coded information into the image data representing the dot image, the image data representing the dot image are sequentially transferred as the serial image data to the mechanical control unit 26, so that the laser beam is modulated to expose the surface of the electrophotographic photosensitive drum 2. At the same time, in synchronism with the exposure image, the sheet of transfer material 13 starts to be fed again from the standby state.

However, the above control method raises a problem discussed below when practiced while implementing usual temperature adjustment in two modes; i.e., a standby temperature and a printing temperature.

When the process shifts into the printing operation after completion of the image development, a certain period of time is required for the fixer roller 15A to reach the printing temperature.

For example, assuming that the fixer roller 15a used comprises an aluminum-made core with a wall thickness of 2 mm, assuring that the roller's outer diameter is φ25 and the roller's length is 260 mm and the roller has a fluoroplastic layer of 30 μm or thereabout coated on the core assuming that, a halogen heater is used in the fixer roller 15A having output power of 400 W assuming that, the standby temperature is 165° C., and the printing temperature is 180° C., it takes about 6 seconds for the fixer roller 15A to heat from the standby temperature to the printing temperature.

Naturally, the above period of time is prolonged as the weight of the roller is increased, the heater output power is reduced, and the difference between the standby temperature and the printing temperature becomes large.

If the temperature adjustment mode of the fixer roller 15A is shifted to a lower temperature for the standby state to wait for the end of the image development as mentioned above, the period of time required to be prepared for the next printing operation would be dependent on the period of time required for the fixer roller 15A to reach a state capable of starting the fixing operation. This results in the problem of lowering throughput in terms of the sheets of transfer material printed per unit time.

Another laser beam printer of the prior art is arranged as shown in FIG. 4. Referring to FIG. 4, denoted by 201 is a photoreceptor drum as a carrier for an electrostatic latent image, 202 denotes a charge roller for uniformly charging the photoreceptor drum, 207 denotes a scanner motor for scanning a laser beam 206 over the photoreceptor drum 201, 203 denotes a developer for developing the electrostatic latent image, created by a laser beam 206 on the photoreceptor drum 201, using toner, 204 denotes a transfer roller for transferring a toner image to a sheet of print paper, 205 denotes a cleaner for removing the non-transferred toner remaining the photoreceptor drum 201, 208 denotes a fixer for fixing the toner on the sheet of print paper thereto, 209 is a paper feed roller, 211 denotes a pre-resist sensor, and 210 denotes a resist roller for synchronizing the paper feeding and the image production.

A print control system of the printer thus arranged is shown in FIG. 3.

Denoted by 300 is a printer controller for developing an image code signal from a host computer or the like into a dot signal, outputting a print request signal and a spare paper feed signal to a printer engine control unit 301, and further delivering the developed dot data. 301 is a printer engine control unit for controlling communication with the printer controller 300 and various components of the engine. A ROM of the printer engine control unit stores a control program shown as a flow chart of FIG. 6. 302 denotes a fixer control unit for turning on and off a fixer heater based on a control signal from the printer engine control unit 301. 303 denotes a scanner control unit for controlling energization and de-energization of the scanner motor based on a control signal from the printer engine control unit 301. 304 denotes a high voltage control unit for controlling a timed sequence of the charging, development and transfer based on a control signal from the printer engine control unit 301. 305 denotes a paper feed control unit for controlling the spare paper feeding to stop the sheet of print paper after passing the resist sensor, and the paper feeding to be performed for the normal printing, based on a control signal from the printer engine control unit 301. 306 denotes a control line for transferring the communication between the printer controller and the printer engine control unit, the image data, the print request signal, the spare feed signal, etc. 307 to 310 denote control lines for transferring data between the printer engine control unit and the other various units.

A flow chart representing a sequence of spare paper feeding and subsequent paper feeding is shown in FIG. 6. FIG. 6 illustrates various aspects of the prior art, and, particularly, prior art apparatus having a spare paper feed function. FIG. 6 also includes an illustration of a control example wherein a printer engine is connectable to a printer controller 300 without regard to any paper feed function and such a control example is not believed to have been known in the art. The printer engine control unit checks whether or not it is in a print signal receivable state (S201). If the print signal receivable state is determined, then the printer engine control unit waits for a spare paper feed signal while waiting for a print signal (S202, S203). If the print signal is received, then the spare paper feed operation is started and, at the same time, a paper feed jamming detection timer is started (S212–S214). Then, the printer engine control unit checks whether or not the resist sensor detects a sheet of paper (S215), while it also checks whether or not the paper feed jamming detection timer is timed up in its counting (S224). If the sheet of paper has not reached the resist sensor before the time-up, then the control flow goes to a jamming treatment (S225). If the sheet of paper has reached the resist sensor before the time-up, then the printer engine control unit waits for a period of time To sufficient for the sheet of paper to strike against the resist roller and make a loop in the predetermined amount (S216). Subsequently, it stops the paper feed roller and outputs a vertical synch request signal (S216-1, S217), followed by waiting for reception of a vertical synch signal (S218). Thereafter, upon receiving the vertical synch signal, the resist roller is driven to start its rotation and the image is written for completing a printing operation (S219, S220).

If the spare paper feed signal is received prior to the reception of the print signal (S203), then the paper feed roller is driven to start its rotation (S204) and, at the same time, the paper feed jamming detection timer is started (S205). Then, the printer engine control unit checks whether or not the sheet of paper has reached the resist sensor (S206), while it also checks whether or not the paper feed jamming detection timer is timed up in its counting (S207). If the timer has been timed up before the sheet of paper reaches the resist sensor, then the control flow goes to a jamming treatment (S208). If the sheet of paper has reached the resist sensor before the time-up (S206), the paper feed roller is stopped at that moment (S209), and a spare paper feed end flag is set (S210), followed by coming into a print signal standby state (S211).

If the print signal is received during that print signal standby state (S202), then the spare paper feed end flag is reset (S221). Subsequently, the printer engine control unit drives the paper feed roller to start its rotation (S222), and waits for a period of time T1 sufficient for the sheet of paper to strike against the resist roller and make a loop in the predetermined amount after passing the resist sensor (S223). Thereafter, similarly to the above normal printing operation, the printer engine control unit outputs a vertical synch request signal, waits for reception of the vertical synch signal and, upon receiving the vertical synch signal, drives the resist roller to start the printing operation.

Further, if the print request signal is not received until the elapse of a predetermined time after one page has been completely printed, the printer engine control unit performs a post-rotation sequence. FIG. 7 shows a timing chart of primary signals generated during the process of printing of one sheet in a normal manner, printing another sheet with the spare paper feeding, and coming to the stop after the post-rotation sequence. Conventionally, in the post-rotation sequence, the charge, development and transfer are turned off in this order, followed by stopping the scanner motor and the main motor. That sequence is controlled in the same manner even when the sheet of paper having been preliminarily fed remains unprinted.

However, the prior art has suffered from the following disadvantages because the post-rotation sequence is performed in the same manner as the normal printing even with the preliminarily fed sheet of paper being in the standby state.

(1) Even when the spare paper feed signal is received in the standby state where the feed motor and the scanner motor are stopped while waiting for the print request signal and the spare paper feed signal, the sheet of paper is just fed into a predetermined position. Thus, upon receiving the print signal, the sheet of paper is fed again after waiting for the scanner reach the predetermined number of revolutions. Accordingly, the control unit fails to sufficiently fulfill the function of the spare paper feed signal delivered for the purpose of speeding up the first printing.

(2) Delivery of the spare paper feed signal from the control unit implies the fact that the control unit will perform printing in near future. But, since the post-rotation sequence is effected to stop the scanner upon the elapse of the predetermined time after the spare paper feeding, it is disabled to feed the sheet of paper until the scanner has reached the predetermined number of revolutions, even with the print signal received subsequently. This remarkably impairs the advantage of the spare paper feeding.

(3) In addition, the fixer temperature is switched to the standby temperature fairly lower than the printing temperature after the stop of the main motor. Therefore, if the post-rotation sequence is once ended, the paper feeding must be started upon the subsequent print signal after waiting for the fixer temperature to reach the printing temperature, in spite of the preceding spare paper feeding.

SUMMARY OF THE INVENTION

An object of the present invention is to overcome the technical problems as stated above.

Another object of the present invention is to provide an image forming apparatus which can increase throughput without causing such problems as increased cost, larger consumption power, and degradation of the image quality.

According to the present invention, the temperature of a fixer is adjusted to remain at the printing temperature in a standby state between two successive image forming operations. Since the fixer is already in a fixing enable state before shifting to the next image forming operation, it is possible to start the image forming operation at once.

Also according to the present invention, a post-rotation sequence is switched between the case where the process enters the sequence with a sheet of paper preliminarily fed being in a standby state to receive a print signal in the apparatus and the case where a sheet of paper preliminarily fed is not at a predetermined position within the apparatus. Thus, the advantageous effect of the spare paper feeding is maximized to greatly contribute to an increase in throughput.

Further, according to the present invention, when a spare paper feed signal is received in the standby not only is a sheet of paper just fed to the predetermined position, but also those functions which are necessary for the electrophotographic processes, such as driving of a scanner which raising of a fixer temperature, and take some period of time, are stared up. It is thus possible to more considerably speed up the first printing in combination with the spare paper feeding, and to greatly contribute an increase of the printer function.

The above and other objects, effects and advantages of the present invention will be more apparent from the following description and the attached drawings.

BRIEF DESCRIPTION OF THE DRAWINGS

FIG. 3 is a timing chart of the conventional laser beam printer;

FIG. 7 is a timing chart showing an operation sequence in the prior art of FIGS. 6A and 6B;

FIGS. 8, 8A and 8B are control flow charts showing a sequence of spare paper feeding and printing in a first embodiment of the present invention;

FIG. 9 is a timing chart showing an operation sequence in the first embodiment of FIG. 8;

FIGS. 10, 10A and 10B are control flow charts showing a sequence of spare paper feeding and printing in a second embodiment;

FIGS. 11, 11A, 11B and 11C are control flow charts showing a sequence of spare paper feeding and printing operations in a third embodiment of the present invention;

FIG. 19 is a timing chart of a laser beam printer according to a seventh embodiment of the present invention.

DETAILED DESCRIPTION OF THE PREFERRED EMBODIMENTS

[First Embodiment]

A first embodiment of the present invention is shown in FIG. 8. Hardware for implementing this embodiment can be constituted using the known prior art shown in FIG. 5. Therefore, this embodiment will be described below by referring to a control flow of FIG. 8 stored in a printer engine control unit. This control flow substantially coincides with the contents of that explained before in connection with the prior art in the process from the reception of a print signal for printing control. Thus, after printing the previous page (S301, S302), the elapse of a predetermined time is counted by a timer (S303). If the print signal is not received before the elapse of the predetermined time (S304, S305), then the control flow goes into a post-rotation sequence. However, this embodiment is different from the prior art in the control flow after that point.

More specifically, after entering the post-rotation sequence, the charge, development and transfer operations are sequentially turned off, with time intervals of $T_B$ and $T_C$ between the former two steps and between the latter two steps, respectively (S306–S310). A main motor is then turned off after a period of time $T_D$ (S311, S312), followed by finally checking for the presence or absence of a sheet of paper preliminarily fed (S313). If it is determined that no sheet of paper is preliminarily fed, then the control unit immediately turns off a scanner motor (S319) and comes into a print-waiting state (S320). Conversely, if it is determined that a sheet of paper is preliminarily fed, a scanner continues to be driven for a period of timer setting time $T_E$, while checking the print signal (S314, S315). If the print signal is not received during the period of time $T_E$, then the control unit turns off the scanner motor (S317) and comes into the print-waiting state (S318).

FIG. 9 shows a timing chart in the case where the print signal is received during the rotation of the scanner after entering the post-rotation sequence under the presence of the sheet of paper preliminarily fed (i.e., the resetting of a spare paper feed end flag).

Figure 4:
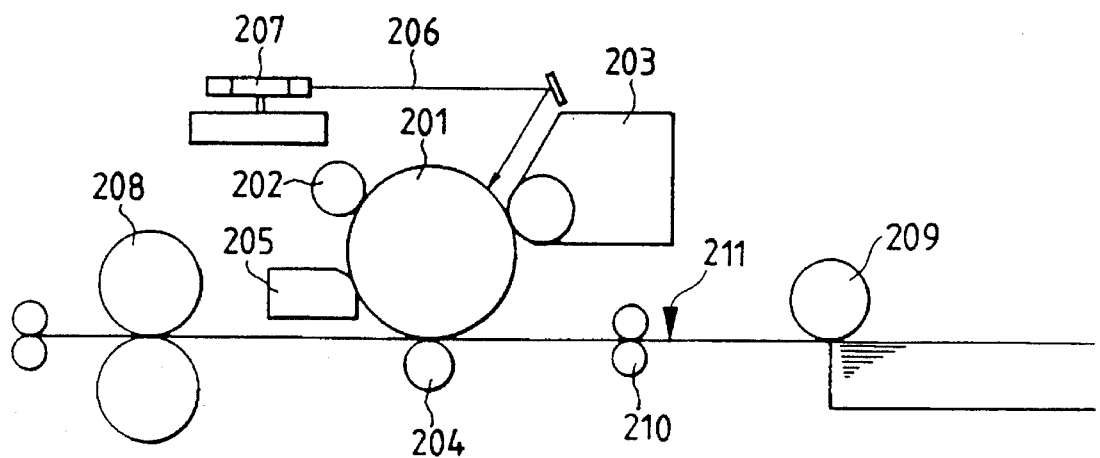
FIG. 4 is a block diagram showing a basic arrangement another typical laser beam printer of prior art.
Figure 2:
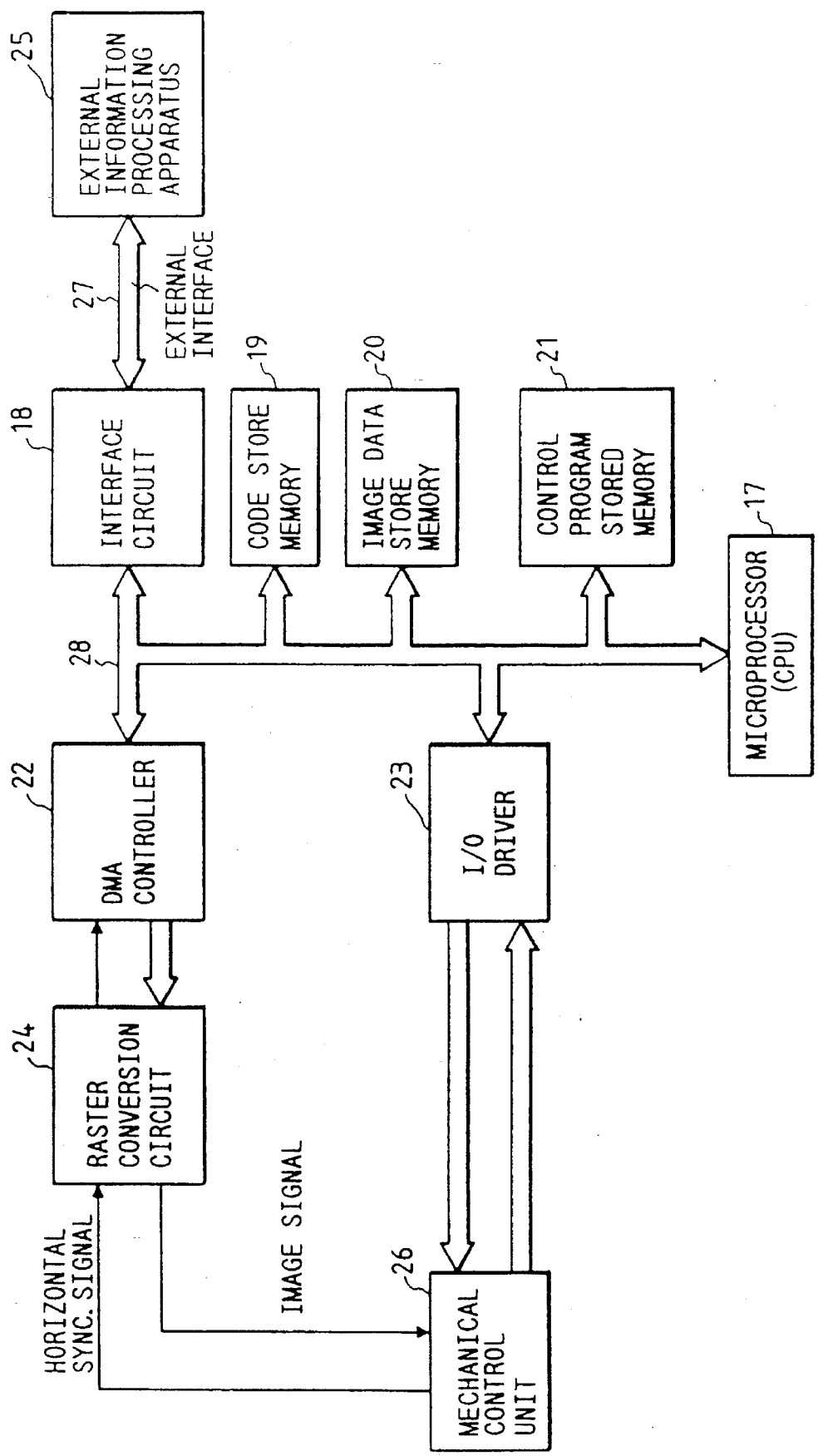
FIG. 2 is a block diagram of a control unit in the conventional laser beam printer.

If the spare paper feed signal is received during the writing of image data for the preceding page, then the printer engine control unit 301 (FIG. 5) drives the paper feed roller 209 (FIG. 4) at the predetermined timing to feed a sheet of paper until the sheet reaches the resist sensor 211. Thereafter, if the next print signal is not received until the elapse of the predetermined time, then the post-rotation sequence is effected. In this sequence, high voltage biases for the charge, development and transfer are sequentially turned off, followed by turning off the main motor after the predetermined time.

In this case, however, since the sheet of paper preliminarily fed is present, the scanner is not turned off, but is continued to be driven for a period of predetermined time.

If the print signal is received after a while (but before turning-off of the scanner), the main motor is driven immediately and, at the same time, each voltage bias is raised up to a required high level. In the normal printing sequence, the paper feed roller is started to be driven after waiting at this point for the scanner motor to reach the predetermined number of revolutions. But, since the scanner motor still continues rotating at the predetermined number of revolutions in this case, the paper feed roller can be driven immediately after the rising of each voltage bias to the required high level. Further, since the sheet of paper, preliminarily fed, has reached the position of the resist sensor, that sheet of paper can reach the resist roller in a short time to thereby start the writing of an image quickly.

As will be apparent from the foregoing, the first printing time required, when the print signal is received after entering the post-rotation sequence under a state that the sheet of paper preliminarily fed remains in the printer, is cut down by an amount corresponding to the time required for start-up of the scanner.

[Second Embodiment]

Figure 10B:
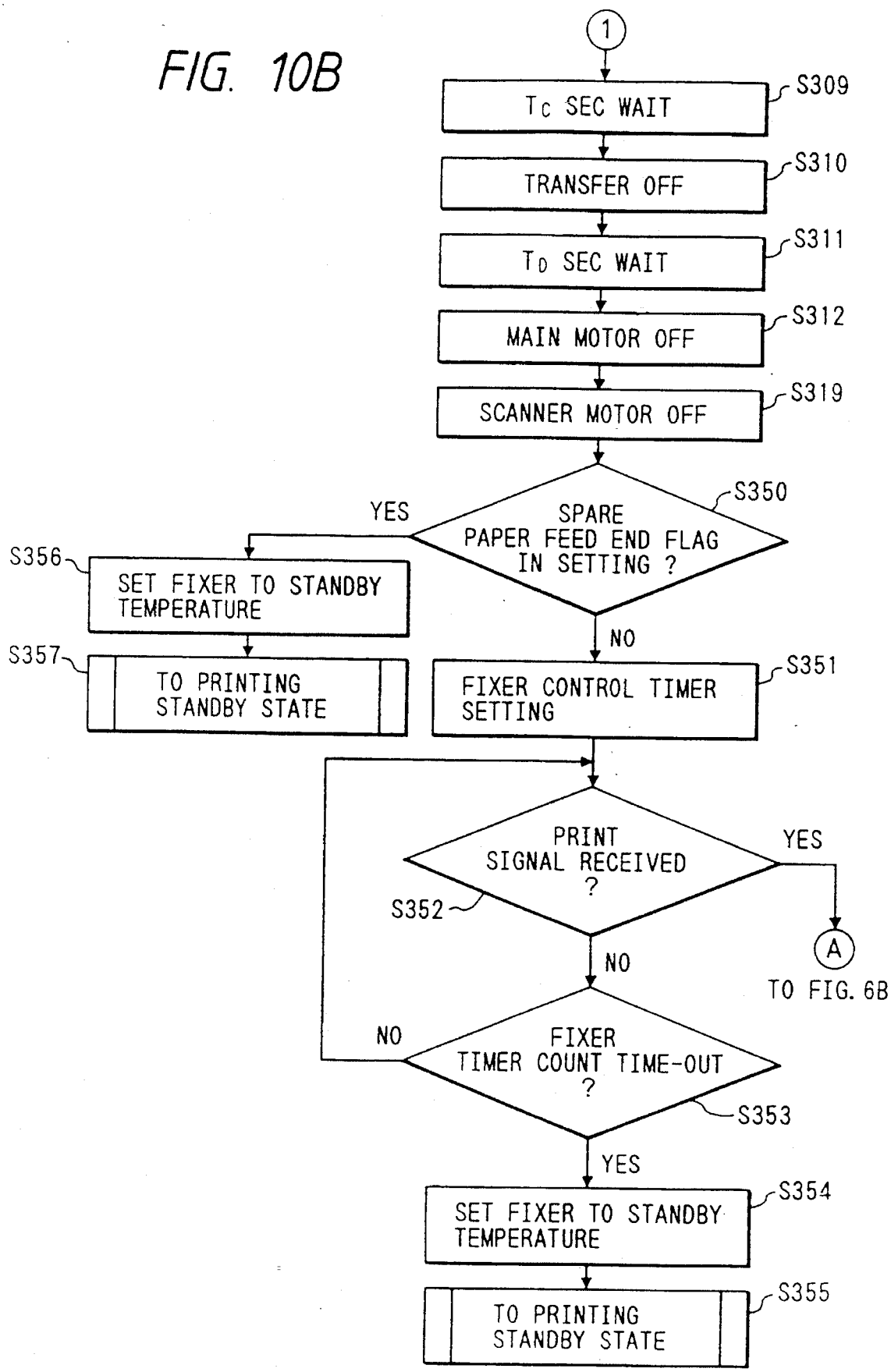

Next, a second embodiment of the present invention will be described with reference to FIG. 10.

This embodiment operates in a similar manner to the above second embodiment shown in FIG. 8 in a sequence from the reception of the print signal to the paper feeding, resisting and printing operations, as well as in a sequence from the reception of the spare paper feed signal to the paper feeding and stopping operations (S301–S312 and S319).

In this embodiment, after the high voltage biases are sequentially turned off and the main and scanner motors are also turned off in the post-rotation sequence (S319), the presence or absence of a sheet of paper preliminarily fed is checked (S350). If the sheet of paper preliminarily fed is absent, then the fixer is set to the standby temperature (lower than the printing temperature) in a like manner to the normal post-rotation, followed by a printing standby state (S356, S357). If the sheet of paper preliminarily fed is present, then the fixer is controlled to remain at a temperature higher than the standby temperature for a period of predetermined time (S351). If the print signal is not received during the predetermined time (S352, S353), then the fixer temperature is switched to the standby temperature for returning to the normal standby state (S354, S355). If the print signal is received in a higher temperature state than the standby temperature, then the fixer temperature is controlled to rise from that temperature to the printing temperature so that the difference therebetween is compensated for, followed by starting the paper feeding.

With this embodiment, even after the control unit enters the post-rotation sequence and comes into the standby state with the sheet of paper preliminarily fed being present, the fixer temperature is held at the printing temperature or a temperature between the standby temperature and the printing temperature for a predetermined period of time. Accordingly, the period of time required for performing the first printing operation upon reception of the next print signal, can be cut down by an amount corresponding to the period of time required for the fixer to reach the printing temperature.

[Third Embodiment]

Figure 11B:
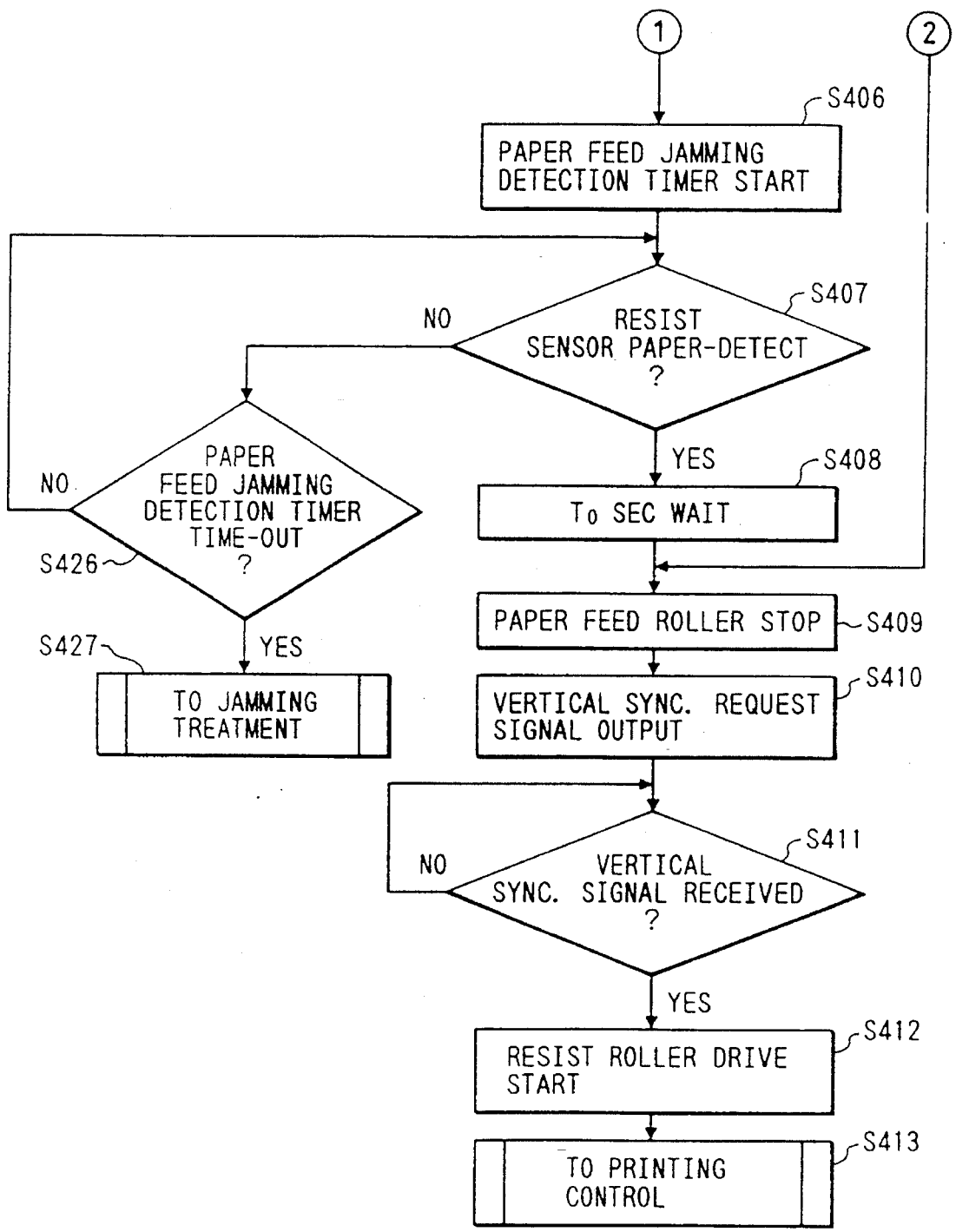
Figure 11C:
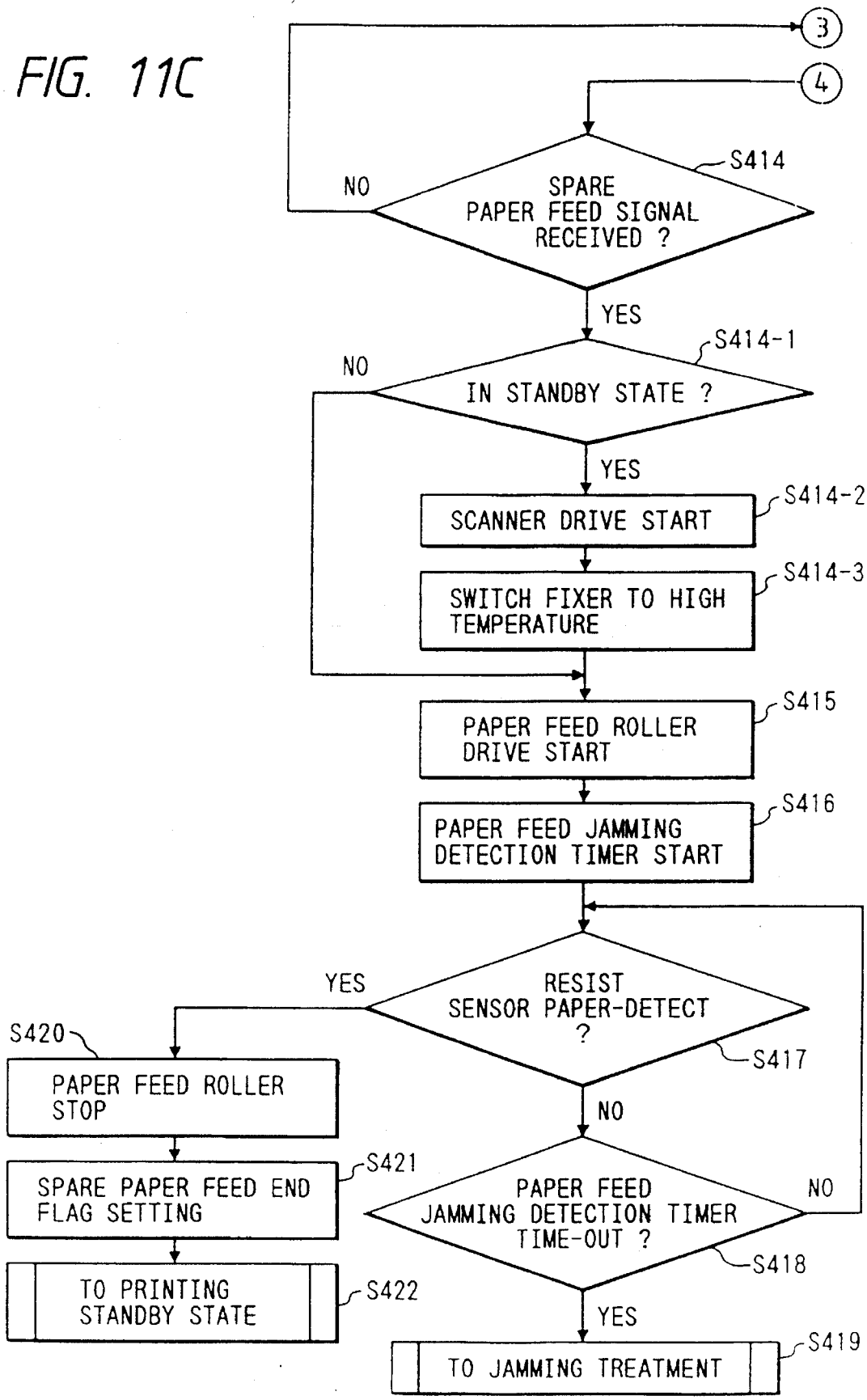

FIG. 11 shows a third embodiment of the present invention. Hardware for implementing this embodiment can be constituted using the known prior art shown in FIG. 5, for example. Therefore, this embodiment will be described below by referring to a flow chart of FIG. 11 stored in the printer engine control unit.

Because the flow chart of FIG. 11 is common to that of FIGS. 6A and 6B except for a feature part of this embodiment, only this feature part will be explained here.

At first, the presence or absence of the print signal is checked (S402). If yes, it is checked whether or not a sheet of paper is preliminarily fed (S403). If the sheet of paper is preliminarily fed, then it is fed to the resist roller and vertical synchronization is performed to start the printing control. If the sheet of paper is not preliminarily fed, then it is checked whether or not the control unit is in a standby state (S403-1). If in the standby state, the control unit enters a pre-rotation (control) sequence and subsequently enters paper feeding control for the printing operation.

If the spare paper feed signal is received before receiving the print signal (S414), then it is checked whether or not the control unit is in a standby state (S414-1). If in the standby state, the scanner is driven to reach the predetermined number of revolutions (S414-2). In parallel, the paper feeding operation is started until the sheet of paper reaches the resist sensor, followed by stopping the paper feed roller (S415, S416). At this time, the scanner remains driven (see FIG. 12). If the print signal is received after that, then the sheet of paper is started to be fed again after performing the pre-rotation sequence (such as rising to the high voltage biases and start-up of the fixer) other than the driving of the scanner. Note that S414-3 is a control step inserted for explaining a fourth embodiment below.

Figure 6A:
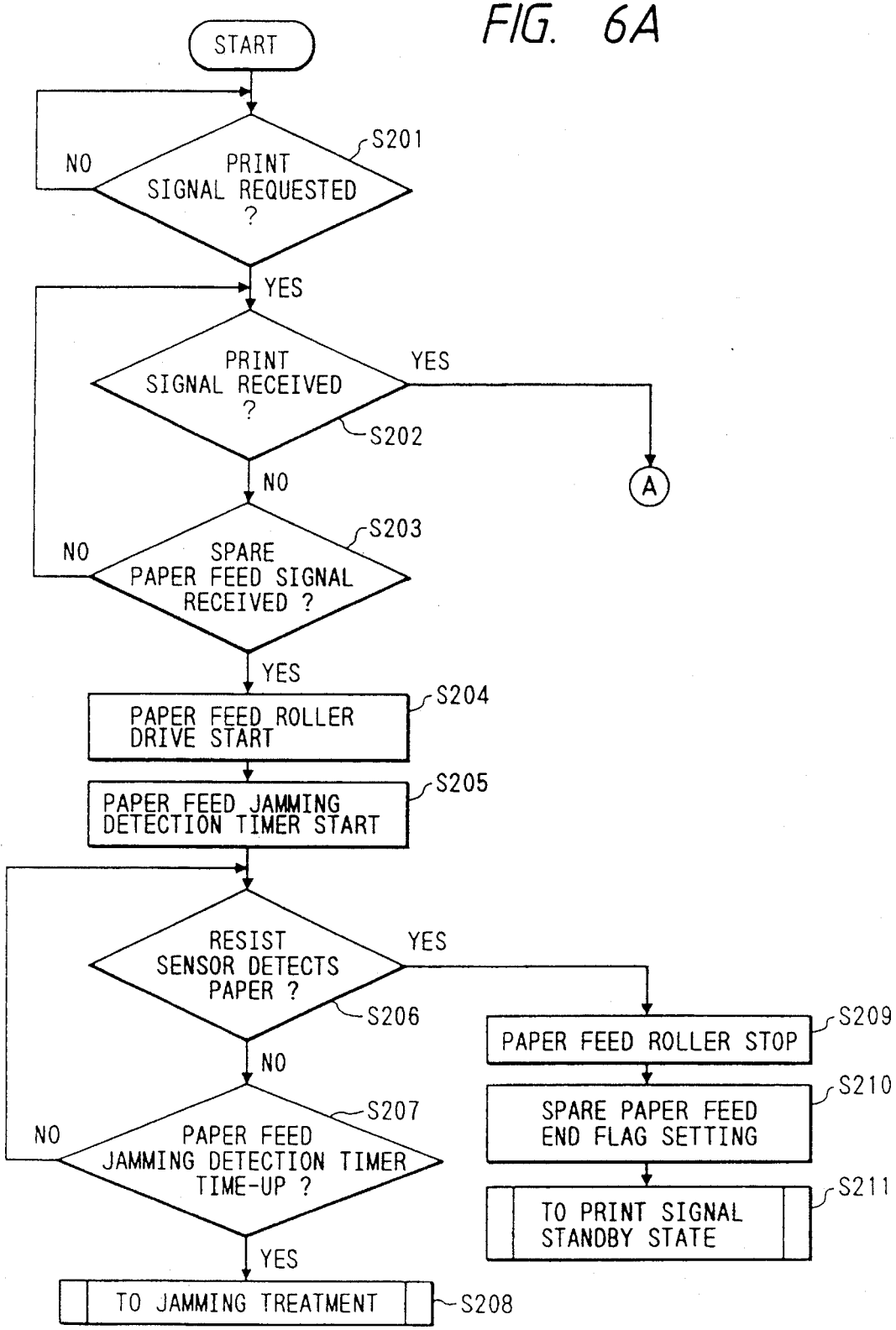
FIGS. 6A and 6B are control flow charts showing a sequence of spare paper feeding and printing operations, aspects of which are in the prior art.
Figure 6B:
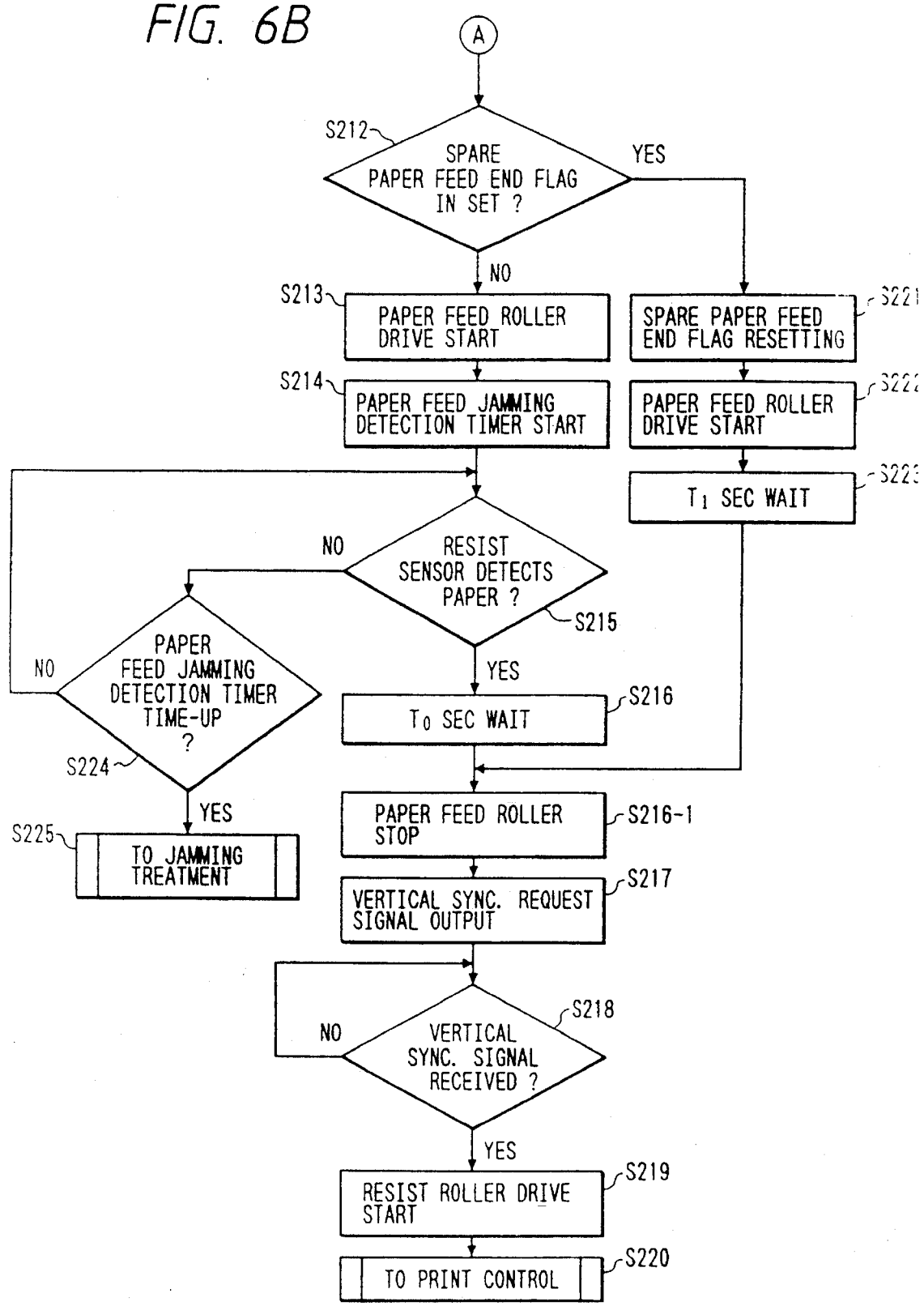
Figure 12:
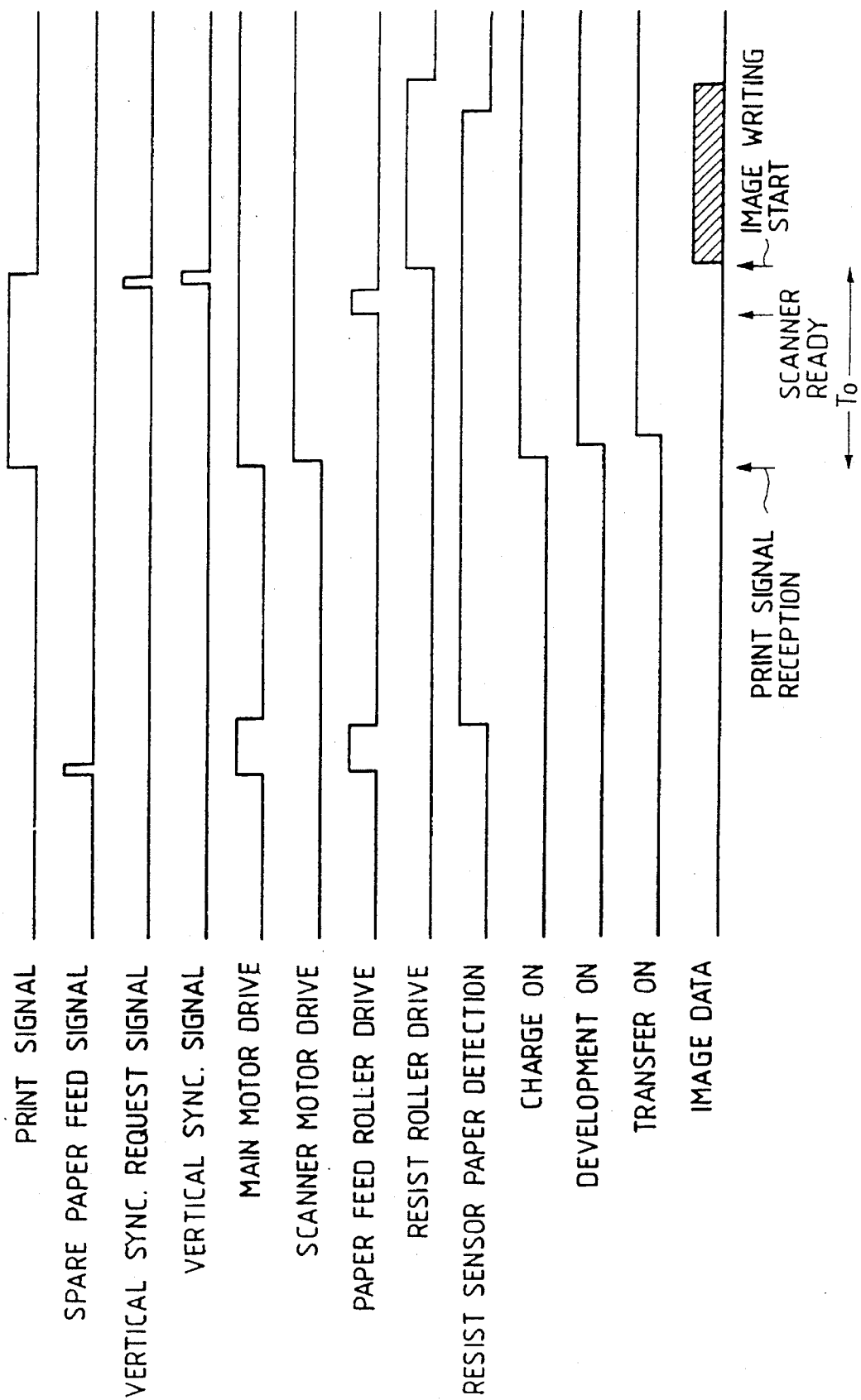
FIG. 12 is a timing chart showing an operation sequence in the prior art.
Figure 13:
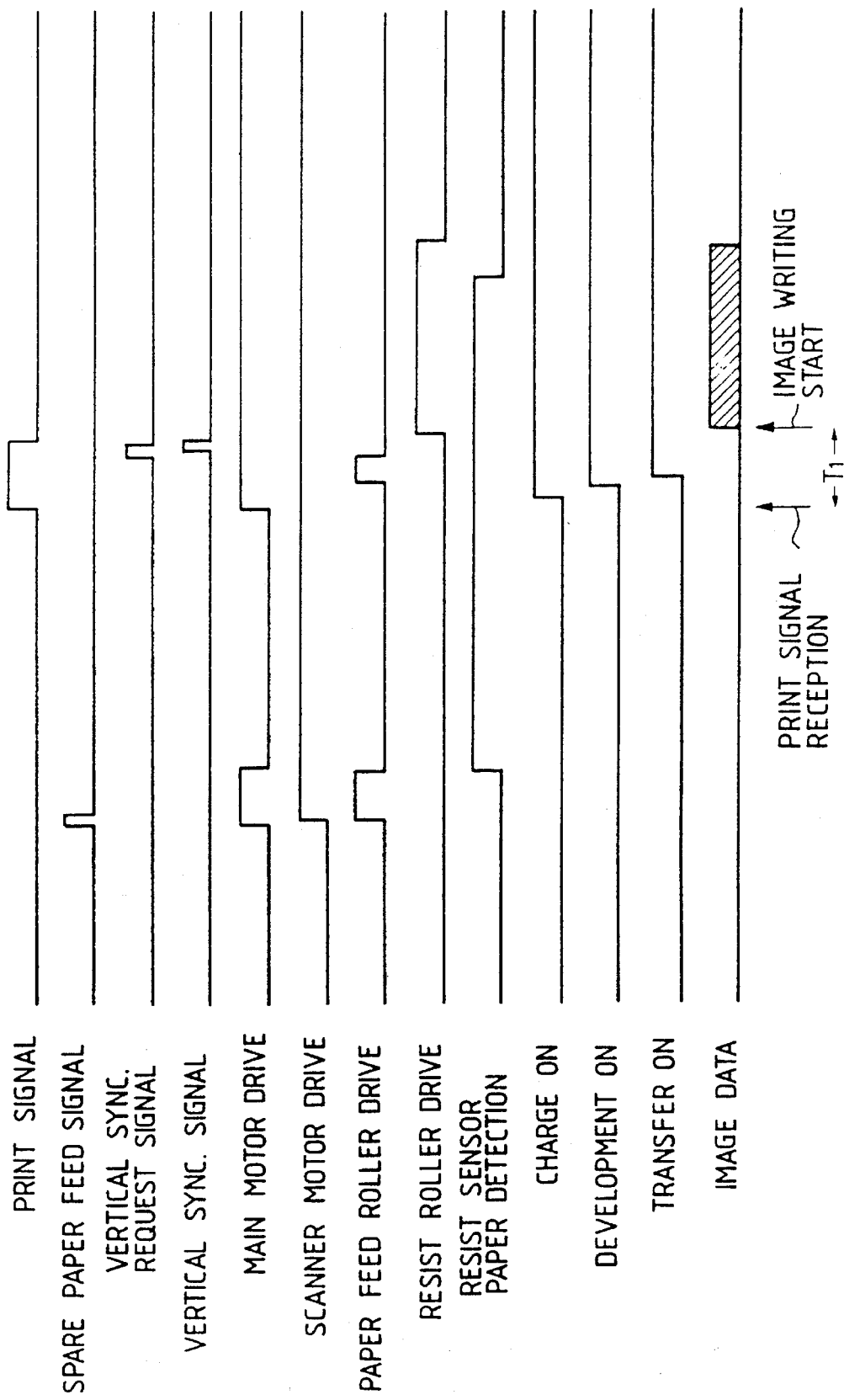
FIG. 13 is a timing chart showing an operation sequence in the third embodiment of the present invention.

FIGS. 12 and 13 show timing charts of primary signals generated when executing a sequence based on the control flows of FIGS. 6A, 6B and 11. FIG. 12 is a timing chart of the prior art when the spare paper feed signal is received in the standby state, while FIG. 13 is a timing chart in this embodiment when the spare paper feed signal is received in the standby state. From these timing charts, the following will be found. In a conventional timing chart where the scanner motor is not driven at the time of starting the spare paper feeding, the control unit waits for the scanner motor to become ready after the pre-rotation sequence, followed by starting the paper feeding upon readiness of the scanner motor. Thus, a period of time $T_O$ is required from the reception of the print signal to the writing of an image. On the other hand, in the timing chart of this embodiment where the scanner motor is also driven at the time of starting the spare paper feeding, the paper feeding can be started midway in the pre-rotation sequence, and only a period of time $T_1$ is required from the reception of the print signal to the writing of an image.

[Fourth Embodiment]

In this embodiment, upon receiving the spare paper feed signal in the standby sate, an additional step S414-3 is executed to start control of the fixer temperature at a high temperature (e.g., the printing temperature) higher than the standby temperature, in addition to the driving of the scanner motor performed in the above third embodiment. In other words, if the scanner motor is driven upon the reception of the spare paper feed signal, the period of time taken from the reception of the print signal to the image writing is cut down to a large extent. Accordingly, if the fixer temperature is switched from the standby temperature to the printing temperature upon the reception of the print signal like the prior art, there is a fear that the fixer temperature may not be raised up to the printing temperature until the sheet of print paper reaches the fixer. This fear can be eliminated by starting to control the fixer temperature to become higher than the standby temperature in the spare paper feeding step.

While the timing chart is similar to that of FIG. 13 shown in connection with the above third embodiment, the fixer temperature is started to be controlled to the printing temperature at the same time the scanner motor is driven upon the reception of the spare paper feed signal. The other control steps remain unchanged. However, since the printing is started from the condition that the scanner is already in a ready state as stated above, the period of time $T_1$ in FIG. 3 is further cut down from the value obtainable with the above third embodiment.

As described above, when the spare paper feed signal is received in the standby state, not only the sheet of paper is fed to the predetermined position, but also a feasible part of the electrophotographic process, e.g., rotation of the scanner at the predetermined number of revolutions and possibly control of the fixer temperature to a higher temperature in combination with the former, is executed. The period of time required from the reception of the next print signal to start-up of the printing is thereby cut down to a large extent. As a result, the advantageous effect of the spare paper feeding to increase throughput can be maximized to greatly contribute an improvement in the printer performance.

[Fifth Embodiment]

Figure 1:
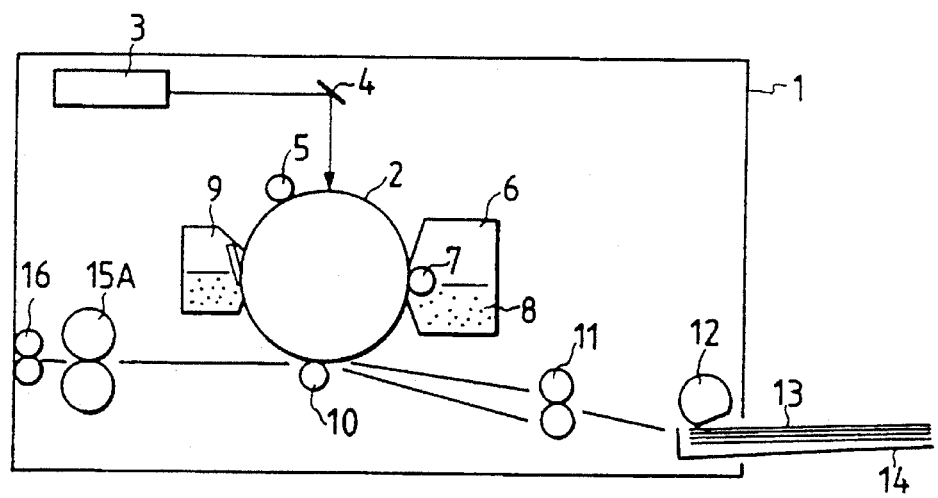
FIG. 1 is a schematic view showing an arrangement of a conventional laser beam printer.
Figure 14:
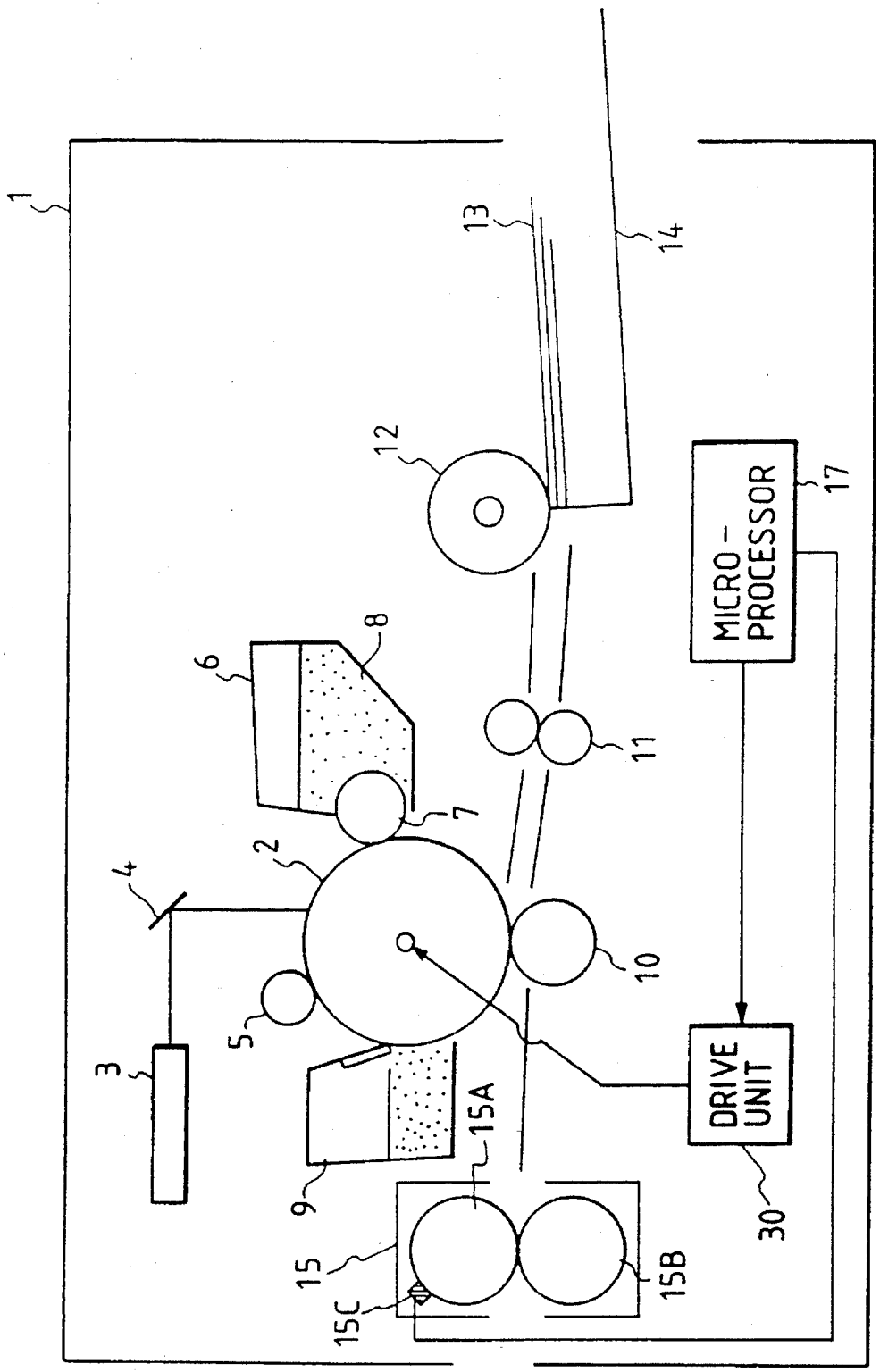
FIG. 14 is a schematic view showing an arrangement of a laser beam printer according to a fifth embodiment of the present invention.
Figure 15:
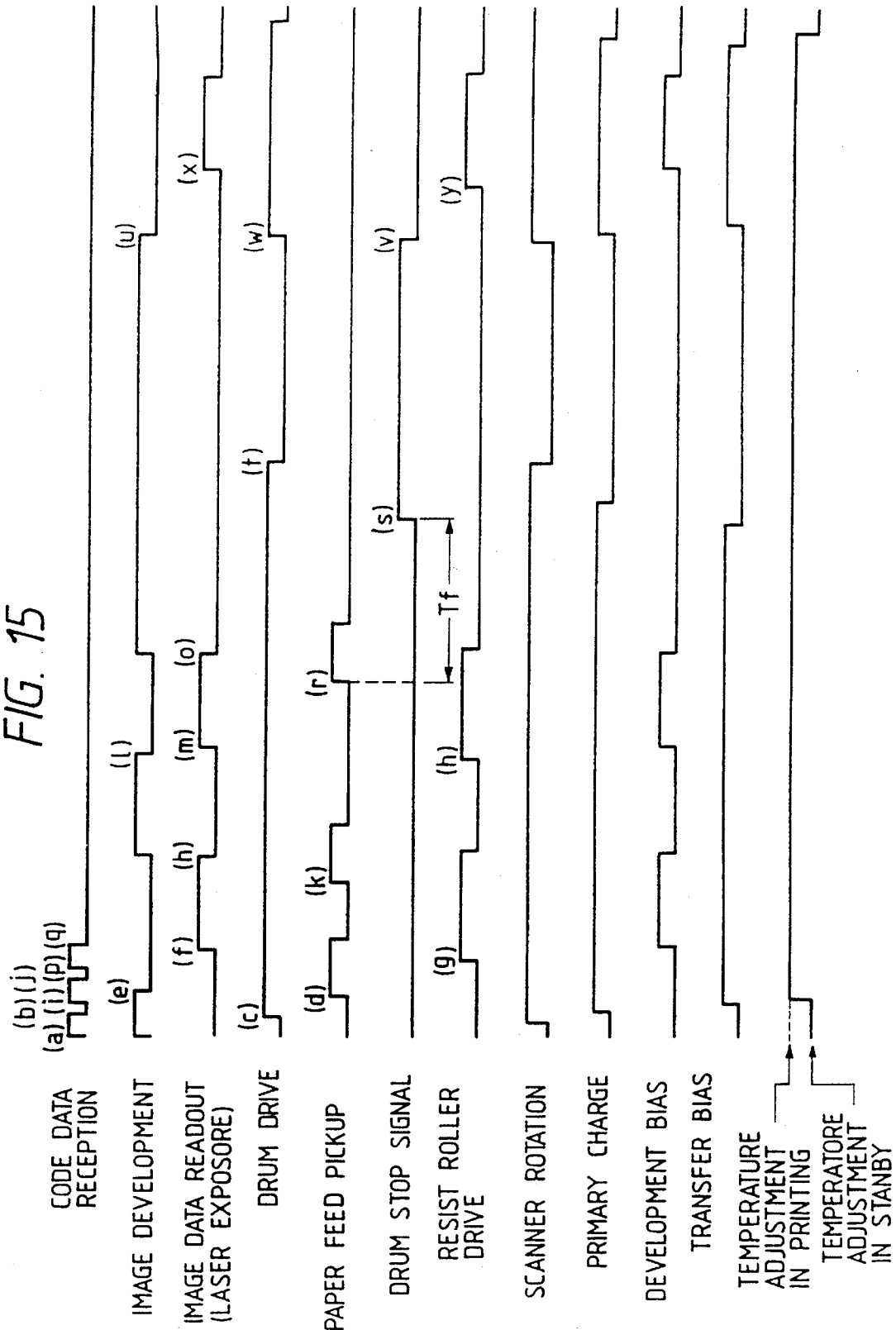
FIG. 15 is a timing chart of the laser beam printer according to the fifth embodiment of the present invention.

Next, a fifth embodiment of the present invention will be described. This embodiment is partly similar to the prior art of FIG. 1. In FIG. 14, therefore, components common to those in FIG. 1 are denoted by the same reference numerals.

Referring to FIG. 14, the surface of an electrophotographic photoreceptor (photosensitive drum) 2 is uniformly charged by a charge roller 5. Then, a laser beam from a laser scanner 3 irradiates the photosensitive drum 2 through a reflection mirror 4 so that an image is exposed to create a latent image. Subsequently, toner 8 in a developer 6 is applied to develop the latent image by a development roller 7. On the other hand, sheets of transfer material 13 such as paper stacked in a paper cassette 14 are fed one by one and held in a standby state with a leading end of each sheet nipped by the resist roller 11 in pair. The sheet of transfer material 13 is then fed to a transfer roller 10 in synchronism with writing of an image onto the photosensitive drum 2. The image transferred to the sheet of transfer material 13 is fixed by a fixer 15 comprising a fixer roller 15A having a heater therein and a pressure roller 15B, following which the sheet is discharged externally of the printer. The toner remaining on the photosensitive drum 2 after the transfer is cleaned by a cleaner 9. Thereafter, the image forming process comprised of the charging and subsequent steps is repeated. Temperature adjustment of the fixer 15 is performed by turning on and off energization of the heater based on the temperature detected by a temperature sensor 15C.

When the period of time required from start of the paper feeding operation to complete conversion of coded characters or figure information, received from an external information processing apparatus into pixel information, is in excess of a certain time Tf, the photosensitive drum 2 is stopped in its driving after the drum surface is charged with uniform potential by only the primary charging. On the side of the fixer 15, it waits for the end of the image development while keeping the temperature adjustment in a mode for the printing.

Figure 5:
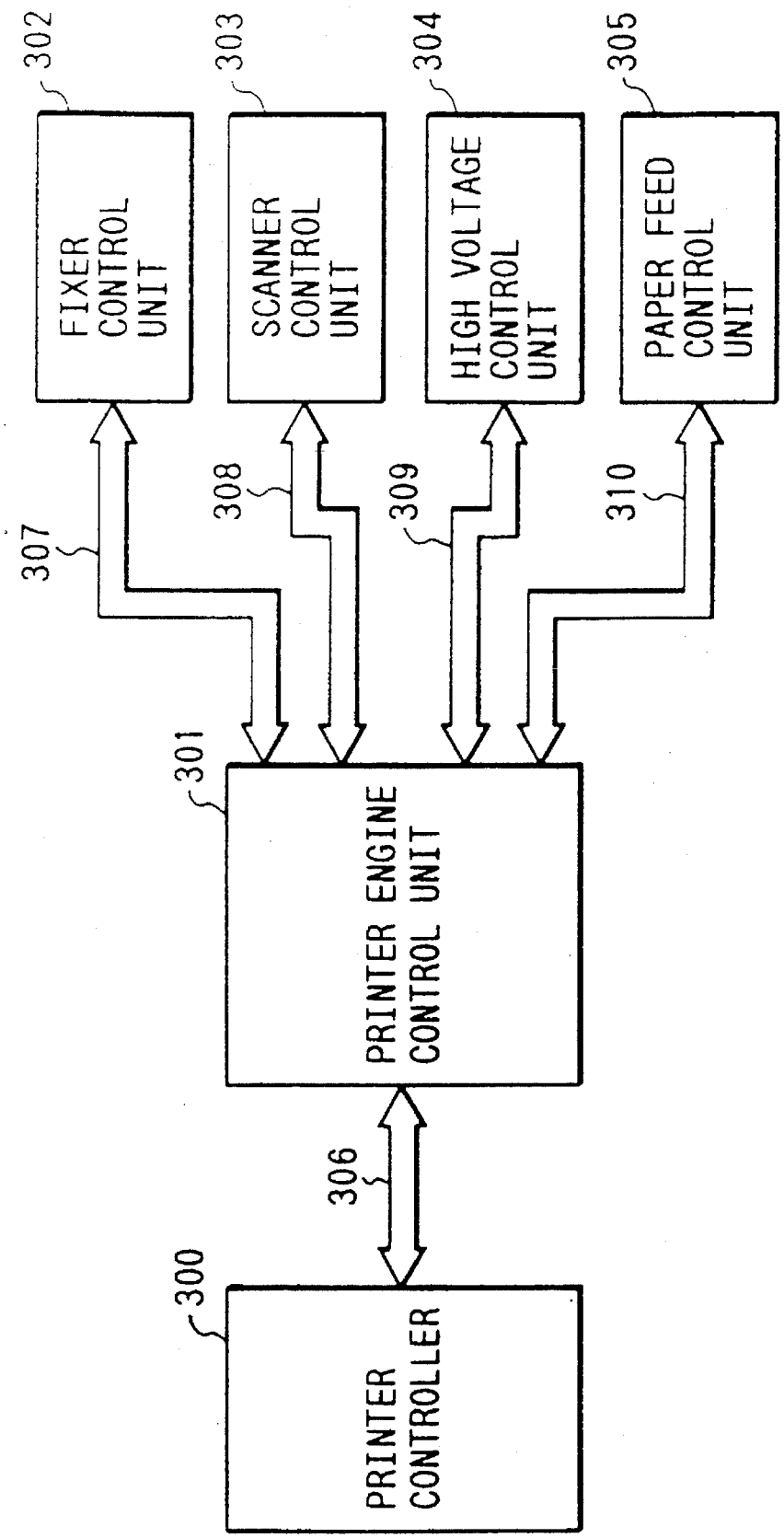
FIG. 5 is a block diagram showing a print control system of the laser beam printer of FIG. 4.

One example of a timing chart for the operation sequence of this embodiment is shown in FIG. 5. In this example, coded information of three pages is assumed to be received in periods (a) to (b), (i) to (j) and (p) to (q) each for one page.

At first, a control unit including a microprocessor 17 starts the image development of the coded information (i.e., the coded information received in the period of (a)–(b)) for the first page. After terminating the reception of the coded information for the first page, a feed motor is driven at the timing (c), whereupon the photosensitive drum 2 is driven to rotate (drum drive) and also a laser scan motor is driven (scanner rotation). Then, primary charge and transfer bias are sequentially applied to start a series of print preparatory operations, called a pre-rotation sequence, such as uniform charging over the surface of the photosensitive drum 2 and output adjustment of the laser beam. Afterward, at the timing (d) to synchronize the image on the photosensitive drum 2 and the sheet of transfer material 13, the paper feed roller 12 is driven to feed the sheet of transfer material 13 up to the position of the resist roller 11 (paper feed pickup operation). Also, at the mode of the timing (d), the temperature adjustment of the fixer is switched from the temperature adjustment standby mode to the temperature adjustment printing mode. Even if the image development for the first page is completed at the timing (e), reading of the image data is not started if the pre-rotation sequence is not ended. If not, therefore, the control unit waits for the end of the pre-rotation sequence, whereupon the reading of the image data is started at the timing (f). In this case, the period of time required for the first page from the timing (d) to start the paper feed pickup operation to the timing (e) at completion of the image development is smaller than the time Tf and, a drum stop signal is not issued.

The laser beam from the laser scanner 3 is modulated while reading the image data, so that the image is written onto the photosensitive drum 2. When the sheet of transfer material 13 reaches the resist roller 11, the resist roller 11 is driven to feed the sheet of transfer material 13 so as to ensure the synchronized relationship (at the timing (g) with a lag corresponding to the difference $T_1-T_2$ between the period of time $T_1$ required for the photosensitive drum 2 to move through a distance $l_1$ from the laser exposure position to the transfer roller 10 and the period of time $T_2$ required for the sheet of transfer material 13 to move through a distance $l_2$ ($<l_1$) from the resist roller 11 to the transfer roller 10).

At the time the electrostatic latent image written under the laser exposure on the photosensitive drum 2 comes to the development position, the development bias is applied to develop the latent image.

After the image data for the first page are completely read at the timing (h), the image development of the coded information for the second image received is started in the period (i) to (j).

In this case, since the microprocessor 17 has already received the coded information for the second page, the paper feed pickup operation for the second page is performed at the timing (k) during the reading of the image data for the first page. With the image development for the second page being longer than a period of the interpaper processing time in the printer, the sheet of transfer material 13 is nipped by the resist roller 11 and waits for the end of the image development while making a loop. At the timing (l) corresponding to the end of the image development, the elapsed time from the timing (k) to start the paper feed pickup operation has not reached Tf. Without issuing the drum stop signal, therefore, the sheet of transfer material 13 is fed at the timing (n) and the image data are read at the timing (m).

Since the microprocessor 17 has already received the coded information for the third page, the paper feed pickup operation for the third page is performed at the timing (r) during the reading of the image data for the second page. Upon completion of the reading of the image data for the second page, the image development for the third page is started. As to the third page, the image development is not ended after the elapse of the period Tf from the timing (r) to start the paper feed pickup operation and, therefore, the microprocessor 17 issues the drum stop signal at the timing (s).

In response to the drum stop signal, the transfer bias is turned off and the surface of the photosensitive drum 2 is charged to uniform potential by only the primary charging, following which a drive unit 30 stops the drum at the timing (t). At this time, however, unlike the normal stop of the printer operation, the temperature adjustment of the fixer is not switched to a lower temperature in the standby state, but remains at the printing temperature.

When the image development is ended at the timing (u), the drum stop signal is ceased at the timing (v). Thereupon, the drum is driven again to start rotation at the timing (w) and the primary charging is performed. Since the fixer is maintained in a fixing enable state, the scanner is then started up. When the surface of the photosensitive drum 2 assumes a latent image forming enable state, the resist roller 11 is driven at the timing (y) to feed the sheet of transfer material 13 so that the image data are started to be read at the timing (x).

Thus, if the period of time from the paper feed pickup operation to the rotation of the photosensitive drum exceeds Tf, the transfer bias and the primary charge bias are both turned off and the driving of the drum is stopped. This prevents deterioration of the photosensitive drum 2 caused by charging for a long period of time, cuts and scratches on the surface of the photosensitive drum 2 caused by the cleaner 9 during rotation of the photosensitive drum 2 for a long period of time, abrasion of the cleaner 9, etc. Further, since the fixer is held under the temperature adjustment for printing, even during the stop of the photosensitive drum 2, the print speed will not be lowered at the restart-up after completion of the image development attributable to the period of time required for the fixer to be heated from the standby temperature to the printing temperature.

Now, this image forming apparatus (laser printer) has not received the coded information after the third page, and so the paper feeding operation for the fourth page is not performed. Thus, after the image for the third page has been transferred to the sheet of transfer material, the microprocessor performs an operation called as a post-rotation sequence where the transfer bias is turned off, the surface of the photosensitive drum 2 is charged to uniform potential by only the primary charging, and the sheet of transfer material 13 is discharged externally of the printer, followed by stopping both the drum drive and the scanner rotation. In addition, the temperature adjustment of the fixer is returned to the lower temperature in the standby state and the printer is stopped.

The value of Tf depends on various conditions such as the material of the photosensitive drum 2, the construction of the cleaner 9 and the process speed. For example, using an image forming apparatus comprising the photosensitive drum 2 comprising an aluminum cylinder of $\phi 30$ coated with both a charge generating layer formed by dispersing a phthalocyanine dye into styrene resin as a binder and a charge carrier layer formed by dispersing a hydrazone compound into polycarbonate resin as a binder, the cleaner 9 comprising a urethane rubber blade with a thickness of 2 mm and hardness of 65 degrees (JIS-A) which is inclined to abut against the surface of the photosensitive drum 2 at an angle of 22° in a direction counter to the rotation thereof, and the process speed being 50 mm/sec, 7000 sheets of paper were printed by repeating a printing cycle of 10 prints nines of which each include character data requiring less than 3 seconds to complete the image development and one of which includes character and figure data requiring more than 10 minutes to complete the image development thereof. The results were as follows. In the case of Tf=5 minutes, the urethane rubber blade of the cleaner 9 was scratched and a cleaning failure occurred. Any image defects due to a change in quality of the photoreceptor did not however occur. In the case of Tf=3 minutes, while a cleaning failure did not occur, the polycarbonate resin as the surface layer of the photosensitive drum 2 was cut, which increased the electrostatic capacity of the photosensitive drum 2 and made the primary charging produce an insufficient charged state, with a very slight blur on the image but no problems in practical use. In the case of Tf=1 minute, there occurred no problems.

From the foregoing, the value of Tf is set to be 3 minutes, preferably 1 minute.

When those prints taking a long period of time for the image development are to be printed more frequently than the above conditions, it is desirable that the value of Tf is set to a smaller value.

Conversely, when such frequency is low, Tf may be set to a value ranging from 10 to 30 minutes with no problems.

As an alternative, the value of Tf may be switched between different values depending on the degree of the frequency at which those prints taking a long period of time for image development occur.

Furthermore, in other cases where the surface layer of the photosensitive drum 2 is formed of resin tending to be cut like acryl resin, the cleaning blade is formed of material susceptible to damages like silicone rubber, or the cleaning unit employs a fur brush or a roller held in abutment against the photosensitive drum, Tf is desirably set to a smaller value than above.

In addition, when the photoreceptor of the photosensitive drum 2 is formed of hard material such as amorphous silicon, Tf may be set to a larger value than above.

[Sixth Embodiment]

This embodiment is featured in that when the period of time required from start of the paper feeding operation to complete conversion of coded characters or figure information, received from an external information processing apparatus, into pixel information is in excess of a certain time Tf, which is preset to prevent deterioration of the photosensitive drum 2 caused by charging for a long period of time, cuts and scratches on the surface of the photosensitive drum 2 caused by the cleaner 9 during rotation of the photosensitive drum 2 for a long period of time, abrasion of the cleaner 9, etc., the driving of the photosensitive drum 2 is stopped after the drum surface is charged with uniform potential by only the primary charging, whereas the fixer 15 waits for the end of the image development while keeping the temperature adjustment in a mode for the printing, and further after the elapse of a predetermined time Ts from the stopping of the driving of the photosensitive drum, the temperature adjustment is returned to a mode for the standby state.

Since the above control process becomes a load on the microprocessor 17, mechanical control of the laser printer is handled by another independent microcomputer 40 in this embodiment.

Figure 16:
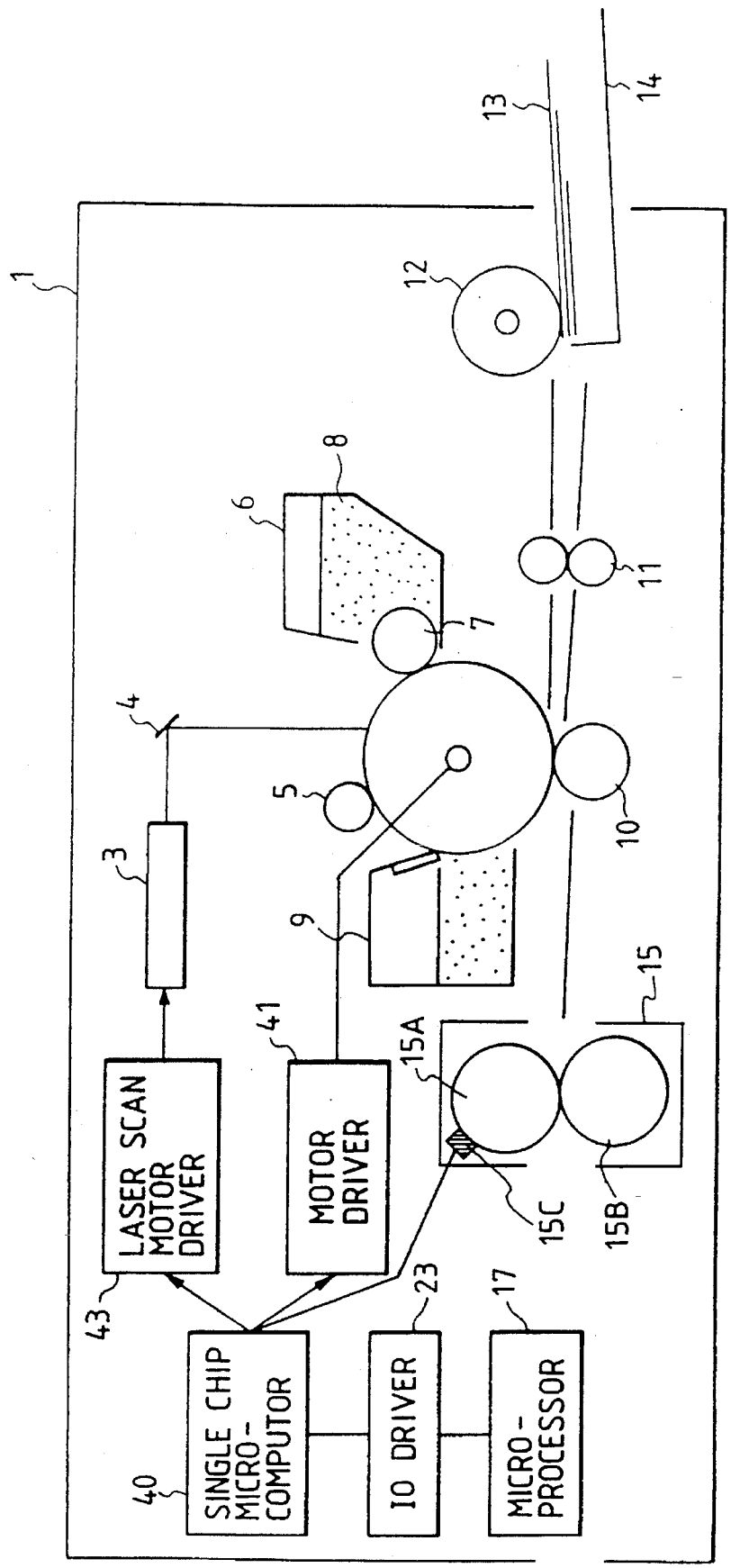
FIG. 16 is a schematic view showing an arrangement of a laser beam printer according to a sixth embodiment of the present invention.
Figure 17:
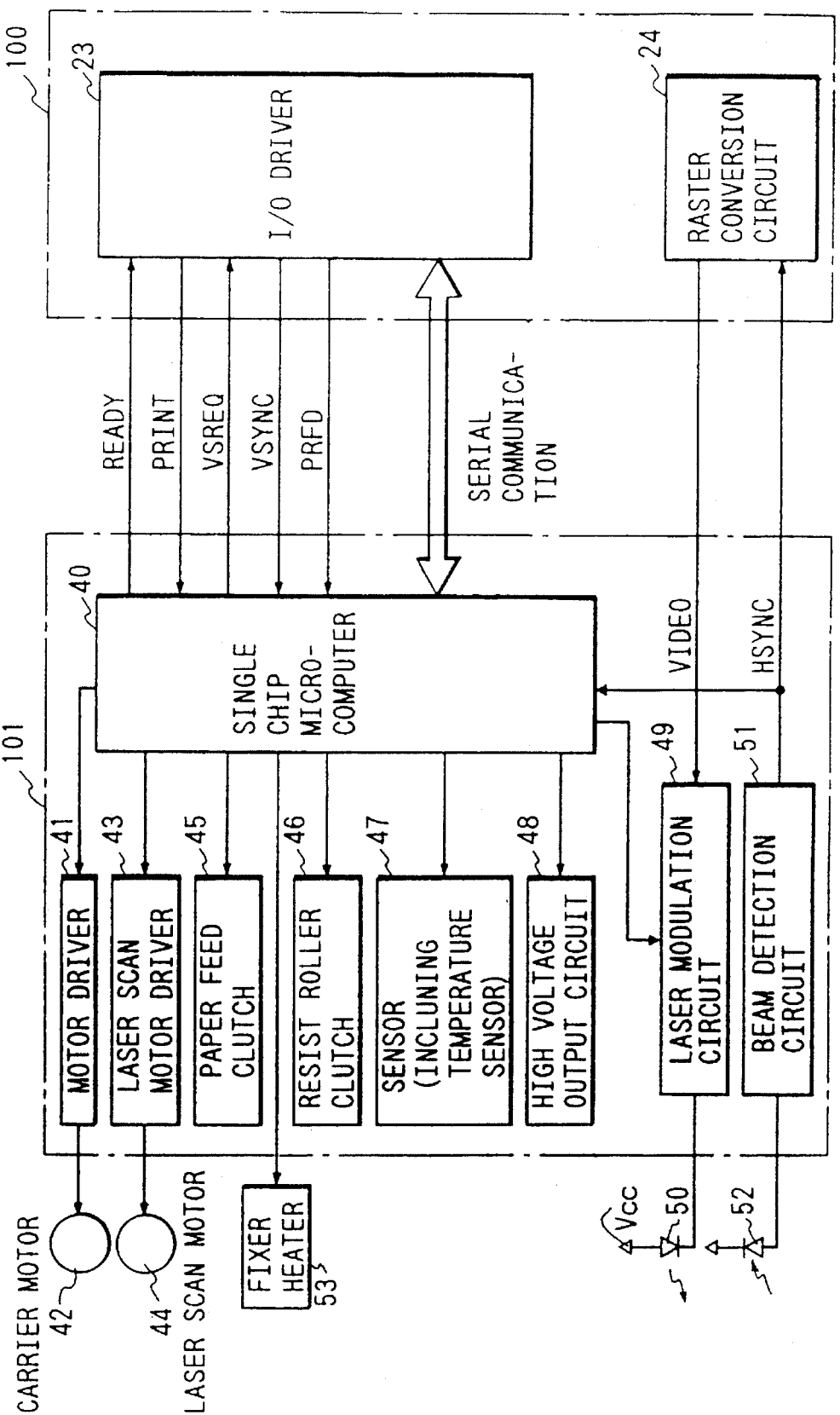
FIG. 17 is a block diagram of a control unit in the laser beam printer according to the sixth embodiment of the present invention.

FIG. 16 shows an arrangement of the body of an electrophotographic printer of this embodiment. A block diagram for control in this embodiment is shown in FIG. 17. The configuration shown in FIG. 17 is divided into a controller unit 100 for principally handling image (video) information, including reception of coded information of an image from an external information processing apparatus and image development of the coded information, and a printer unit 101 for controlling operation of the printer body.

In FIG. 16, mechanical control of the laser printer is executed by a single chip microcomputer 40. Loads on the microcomputer 40 include a motor driver 41, a laser scan motor driver 43, a paper feed clutch 45, a resist roller clutch 46, a sensor 47, a high voltage output circuit 48, a laser modulation circuit 49, a beam detection circuit 51, etc. Temperature adjustment of a fixer is performed by turning on and off energization of a heater 53 based on the temperature detected by a temperature sensor 15C.

The microcomputer 40 controls the above loads in response to commands from an I/O driver 23. Between the microcomputer 40 and the I/O driver 23, a READY signal, a PRINT signal, a VSREQ signal, a VSYNC signal and a PRFD signal are transmitted and received. There are also prepared a serial communication line used for communicating states of the loads of the printer to the I/O driver 23 and communicating special commands from the I/O driver 23 to the microcomputer 40.

An video signal (VIDEO signal) outputted from a raster conversion circuit 24 is applied to the laser modulation circuit 49 for modulating a laser beam emitted from a semiconductor laser 50 in accordance with the VIDEO signal. The modulated laser beam is scanned by a laser beam scan mirror, and the scanned laser beam impinges upon a photodiode 52 disposed in a scan path of the laser beam. Then, the laser beam is converted into a pulse signal by the beam detection circuit 51. The pulse signal outputted from the beam detection circuit 51 is applied as a horizontal synch signal (HSYNC signal) to the raster conversion circuit 24.

Figure 18:
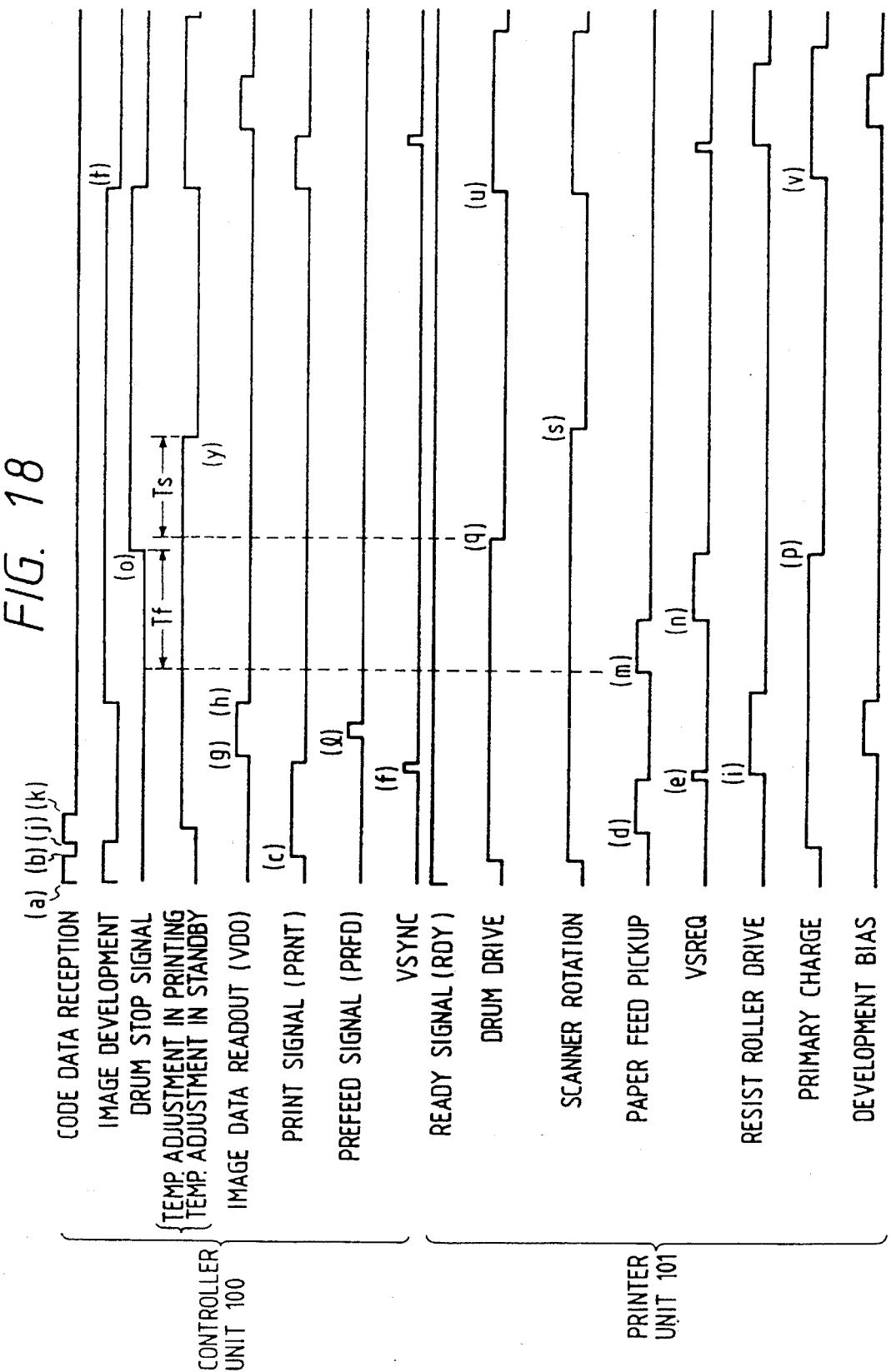
FIG. 18 is a timing chart of the laser beam printer according to the sixth embodiment of the present invention.

The case of receiving the coded information for the first page which does take a period of a relatively short time in image development and receiving the coded information for the second page which does take a period of a relatively long time in image development will now be explained with reference to a timing chart of FIG. 18.

At first, under a condition that the printer unit 101 is powered on and held in a state able to always receive a print signal PRINT there is, a ready signal RDY. In this condition, when the controller unit 100 has completely received the coded information of one page in a period of (a) to (b), it sends a print signal PRINT to the printer unit 101 at the timing (c). In response to the print signal, the printer unit 101 starts driving of the drum and rotation of the scanner so that primary charge and paper feed pickup are sequentially performed to be ready for receiving the video signal. Specifically, the paper feed pickup is performed at the timing (d) to feed the sheet of transfer material 13. Then, at the timing (e) where the leading end of a sheet of transfer material 13 abuts against a resist roller 11 and makes a loop, the signal VSREQ is set true to inform the controller unit 100 of that the printer unit 101 is now ready for receiving the video signal. In this state, the printer unit 101 waits for transmission of the video signal.

Meanwhile, the controller unit 100 performs the image development of the coded information. At the timing (f) where there is a signal VSREQ after the image development, the controller unit 100 issues the signal VSYNC to inform start of delivering the image data. Then, the image data are read and delivered as the video signal (VDO) to the printer unit 101 in a period of (g) to (h).

Upon receiving the VSYNC signal, the printer unit 101 drives the resist roller 11 at the timing (i) so that the sheet of transfer material 13 on standby is fed toward the photosensitive drum 2 in timed relation to synchronize the leading end of the image and the leading end of sheet of transfer material 13, thereby transferring the image to the transfer roller 10.

The controller unit 100 has received the coded information for the second page in a period of (j) to (k) and, at the timing (l), issues a prefeed signal (PRFD) to start the paper feeding operation regardless of the operation of image developing means. Upon receiving the prefeed signal, the printer unit 101 performs the paper feed pickup at the timing (m) which can maximize the throughput of the laser printer. Then, at the timing (n) where the leading end of the sheet of transfer material 13 abuts against the resist roller 11 and makes a loop, the signal VSREQ is set to inform the controller unit 100 of that the printer unit 101 is now ready for receiving the video signal. In this state, the printer unit 101 waits for transmission of the video signal.

Meanwhile, the control let unit 100 performs the image development of the coded information. In this case, since the image development is not ended even after the elapse of Tf from the start timing (m) of the paper feed pickup operation, a drum stop signal is issued at the timing (o).

Upon receiving the drum stop signal, the single chip microcomputer 40 in the printer unit 101 turns off the primary charge at the timing (p) and makes the motor driver 41 stop the drum drive at the timing (q).

Further, since the image development in the controller unit 100 is not yet ended even after the elapse of Ts from the stop of the drum drive, the controller unit 100 switches the temperature adjustment of the fixer to a standby mode at the timing (r).

At the timing (h) where the image development is completed, the control let unit 100 issues the drum stop signal and also switches the temperature adjustment of the fixer again to a printing mode. Correspondingly, the single chip microcomputer 40 in the printer unit 101 makes the motor driver 41 rotate a carrier motor 42, thereby resuming the drum drive.

Then, the single chip microcomputer 40 resumes the primary charge at the timing (v) and, thereafter, issues the VSREQ signal upon complete readiness of the laser scanner. In response to the VSREQ signal, the controller unit 100 delivers the VSYNC signal to the printer unit 101, whereupon the printer unit drives the resist roller 11 so that an image in the form of the video signal (VDO) read out of the controller unit is transferred to the sheet of the transfer material 13. After the reading of the image data, the printer unit 101 enters a post-rotation sequence in which the primary charge the, drum drive and the scanner rotation are stopped and the temperature adjustment of the fixer is switched to a standby mode, bringing the operation to an end.

The period Tf+Ts in this embodiment corresponds to a period in which the fixer is not performing the fixing operation. If this period were prolonged, the temperature within the printer body would be raised too high or, in the case of using a pressure roller, its service life is affected by the total heat amount applied thereto. In a printer designed to perform the temperature adjustment between 165° C. in a standby mode and 180° C. in a printing mode, the following was found. When the value of Tf+Ts was more than 3 minutes, the temperature of the cleaner 9 at a point closest to the fixer 15 exceeded the temperature in an equilibrium condition as produced under the temperature adjustment in a standby state. When it was over 15 minutes, that temperature was raised on the order of 12° C. with another equilibrium condition being produced. The temperature rise of the cleaner 9 may invite blocking of the toner in the cleaner and thus prevent storage of the toner, thereby causing a cleaning failure. In view of the above, a continuous endurance test was conducted on assumptions that the value of Tf+Ts was set to 15 minutes and the image used took about 15 minutes in the image development. As the result, a cleaning failure occurred after printing approximately 4000 sheets of transfer material. On the other hand, from the result of another endurance test conducted on assumptions that the value of Tf+Ts was set to 5 minutes and the image used took about 5 minutes in the image development, no abnormality was found. From the above results, it is desirable that the value of Tf+Ts is set to be about 5 minutes or less.

Incidentally, the value of Tf may be determined like the fifth embodiment.

Thus, with this embodiment, since the temperature adjustment of the fixer is once returned to a lower temperature in the standby mode for such data as requiring a long period of time to complete the image development, an excessive temperature rise within the printer body will not be caused.

Further, since this embodiment includes the controller unit 100 and the printer unit 101 separate from each other, a sufficient degree of extension can be provided to accommodate a host apparatus having a variety of page descriptive languages. In addition, since the controller unit 100 can be operated with no need of considering the paper feed timing in the printer unit 101, the control process is simplified.

[Seventh Embodiment]

This embodiment is featured in that when the period of time required from start of the paper feeding operation to complete conversion of coded characters or figure information, received from an external information processing apparatus, into pixel information is in excess of a certain time Tf which is preset to prevent deterioration of the photosensitive drum 2 caused by charging for a long period of time, cuts and scratches on the surface of the photosensitive drum 2 caused by the cleaner 9 during rotation of the photosensitive drum 2 for a long period of time, abrasion of the cleaner 9, etc., the driving of the photosensitive drum 2 is stopped after the drum surface is charged with uniform potential by only the primary charging, whereas the fixer 15 waits for the end of the image development while keeping the temperature adjustment remained in a mode for the printing, and further after the elapse of a predetermined time Ts from the stop of the photosensitive drum in its driving, the temperature adjustment is shifted to a mode for a pre-standby state to keep a temperature higher than the standby temperature but lower than the printing temperature.

FIG. 19 is a view showing a timing chart in this embodiment. This embodiment is operated exactly in the same manner as the above embodiment except for the timing of temperature adjustment. This embodiment is different from the sixth embodiment in that when the image development takes a period of time beyond a certain value, i.e., it requires more than the certain time Ts from the timing (g) to stop the drum drive, the temperature adjustment is switched to a pre-standby mode at the timing (Y). Use of the temperature adjustment in pre-standby can reduce the period of time for the fixer to restore to a fixing enable state when the image forming operation is started upon the end of the image development. The print speed can be thereby increased.

One practical example is as follows. Let it be assumed that in the image forming apparatus explained in connection with the above sixth embodiment, the apparatus uses a heat source comprising a heater of 400 W, has a fixer roller comprising an aluminum core with a wall thickness of 0.8 mm and length of 220 mm, and performs the temperature adjustment by setting a standby temperature to 160° C., a pre-standby temperature to 170° C. and a printing temperature to 180° C. In this case, the period of time required to reach the printing temperature again from the standby temperature is about 4 seconds. On the contrary, the period of time required to reach the printing temperature again from the pre-standby temperature is just about 2 seconds. This decrease in the required time directly leads to a decrease in the image forming time.

The temperature adjusted in the pre-standby mode is determined depending on a degree of temperature rise within the image forming apparatus, particularly, that of the cleaner 9 at a point closest to the fixer 15. By way of example, therefore, a continuous endurance test conducted on assumptions that the value of Tf+Ts was set to 5 minutes and the image used took about 15 minutes in image development, while changing the pre-standby temperature. As the result, it was found that a cleaning failure might occur when the temperature of the cleaner 9 at a point closest to the fixer 15 was raised in excess of about 10° C. with respect to an equilibrium temperature in the standby mode. Note that the pre-standby temperature in this case was 176° C. It is thus believed that in the case of setting the value of Tf+Ts to 5 minutes, the pre-standby temperature requires a setting less than 175° C.

What is claimed is:

1. An image forming apparatus comprising:

means for inputting code information from an external apparatus;

means for converting the input code information into pixel information;

means for forming an image onto a sheet in accordance with the pixel information;

means for feeding a sheet to said image forming means, through an electrographic process; and means for discriminating whether a next page of the code information is inputted, wherein said apparatus is capable of inputting at least the next page of code information during processing of the current page, and said apparatus further comprises means for outputting a predetermined signal instructing a start to feeding the next page during print of the current page when said discriminating means discriminates that input of the code information of the next page has been completed, and control means for controlling said image forming means to start preparation to execute said electrophotographic process in response to the predetermined signal, in cases where the predetermined signal is outputted when the electrophotographic process is not executed.

2. An image forming apparatus according to claim 1, wherein said image forming means comprises scanner means for scanning a light beam and said control means controls a start of driving said scanner means as the preparation to execute said electrophotographic process.

3. An image forming apparatus according to claim 1, wherein said image forming means comprising fixer means for thermally fixing an image formed on the sheet and said control means controls said fixer means to maintain a temperature for fixing operation as the preparation to execute said electrophotographic process.

4. An image forming apparatus according to claim 1, wherein said apparatus stops the sheet at a predetermined position, and subsequently conveys the stopped sheet to said image forming means after converting to the pixel information by said converting means is completed.

5. An image forming apparatus according to claim 4, wherein said image forming apparatus performs different post image forming operations for the current page between the case where the sheet is at said predetermined position and the case where the sheet is not at said predetermined position.

6. An image forming apparatus according to claim 5, wherein said image forming means has scanner means for scanning a light beam and, in the post image forming operation, said apparatus keeps said scanner means in an active state for a longer period in cases where the sheet is at said predetermined position, than in cases where the sheet is not at said predetermined position.

7. An image forming apparatus according to claim 5, wherein said apparatus further comprises fixer means for thermally fixing the image formed on the sheet and, in the post image forming operation, said fixer means maintains a temperature for fixing operation for a longer period in cases where the sheet is at said predetermined position than in cases where the sheet is not at said predetermined position.

8. An image forming apparatus according to claim 5, wherein in the post image forming operation said fixer means is controlled from a fixing temperature to a standby temperature.

9. An image forming apparatus according to claim 4, wherein said apparatus further comprises fixer means for thermally fixing the image formed on the sheet and, in the post image forming operation, said fixer means is dropped from a fixing temperature to a higher temperature in cases where the sheet is at said predetermined position than in cases where the sheet is not at said predetermined position.

10. An image forming apparatus according to claim 1, wherein said image forming means comprises latent image forming means for forming a latent image on a photosensitive member by scanning a light beam modulated in accordance with pixel information, developing means for developing said latent image into a toner image, and transferring means for transferring the toner image forming on said photosensitive member onto the sheet, and wherein said outputting means is capable of starting to feed the next page during formation of the latent image of the current page when said discriminating means discriminates that the input of the code information of the next page has been completed.

11. An image forming apparatus according to claim 10, wherein said apparatus stops the sheet at a predetermined position, and subsequently conveys the stopped sheet to said image forming means after converting to the pixel information by said converting means is completed, and wherein the drive of said photosensitive member is stopped when the converting to the pixel information is not completed even if a predetermined time has elapsed after the sheet is stopped at the predetermined position.

12. An image forming apparatus comprising:

means for receiving first information from an external apparatus;

means for converting the first information into second information;

means for forming an image onto a sheet in accordance with the second information, through an electrophotographic process;

means for feeding a sheet to said image forming means, wherein said apparatus is capable of receiving at least a subsequent page of first information during processing of a current page, and said apparatus further comprises means for discriminating whether or not a next page of the first information is received, means arranged to output a predetermined signal instructing the start of feeding a next sheet irrespective of whether a process of a current page is being performed whenever said discriminating means discriminates that the first information of the next page is received, and means for controlling said image forming means to start the preparation of said electrophotographic process in response to the predetermined signal whenever the predetermined signal is output when the electrophotographic process is not executed.

13. Apparatus according to claim 12, wherein said image forming means comprises scanner means for scanning a light beam and said control means controls the start of driving said scanner means as the preparation of said electrophotographic process.

14. Apparatus according to claim 12, wherein said image forming means comprises fixer means for thermally fixing an image formed on a sheet and said control means controls the temperature of said fixer means to reach the temperature for the fixing operation as the preparation of said electrophotographic process.

15. Apparatus according to claim 12, wherein said apparatus stops a sheet at a predetermined position, and subsequently conveys the sheet to said image forming means after said converting means has completed the conversion of a page of first information into second information.

16. Apparatus according to claim 15, wherein said image forming apparatus performs different post image forming operations for the current page when the sheet is at said predetermined position than when the sheet is not at said predetermined position.

17. Apparatus according to claim 14, wherein said image forming means has scanner means for scanning a light beam and, in the post image forming operation, said control means being arranged to maintain said scanner means in an active state for a longer period when the sheet is at said predetermined position, than when the sheet is not at said predetermined position.

18. Apparatus according to claim 15, wherein said fixer means keeps the fixing operation temperature for a longer period when the sheet is at said predetermined position than when the sheet is not at said predetermined position.

19. Apparatus according to claim 12, wherein said image forming means comprises latent image forming means for forming a latent image on a photosensitive member by scanning a light beam modulated in accordance with second information, developing means for developing said latent image into a toner image, and transferring means for transferring the toner image forming on said photosensitive member onto the sheet.

20. Apparatus according to claim 19, wherein said apparatus stops the sheet at a predetermined position, and subsequently conveys the stopped sheet to said image forming means after said converting means has completed first information for a sheet into second information, and wherein the drive of said photosensitive member is stopped when conversion to the pixel information has not been completed even if a predetermined time has elapsed after a sheet has been stopped at the predetermined position.

21. Apparatus according to claim 12, wherein the first information is a coded character or graphic information and the second information is pixel information.

* * * * *

UNITED STATES PATENT AND TRADEMARK OFFICE
CERTIFICATE OF CORRECTION

PATENT NO. : 5,512,929
DATED : April 30, 1996
INVENTOR(S) : YOJI SERIZAWA, ET AL.

Page 1 of 2

It is certified that error appears in the above-indentified patent and that said Letters Patent is hereby corrected as shown below:

On the title page,
    item, [57] ABSTRACT,
        line 13, "result" should read --result,--.
Column 1,
        line 34, "output - complex" should read -- output coupler--.
Column 2,
        line 51, "50" should read --5,--.
Column 4,
        line 26, "400 W" should read --400 W, and--.
Column 7,
        line 15, "standby" should read --standby state,--;
        line 18, "which" should read --and--;
        line 19, "and" should read --which--;
        line 20, "stared" should read --started--; and
        line 37, "arrangement" should read --arrangement of--.
Column 10,
        line 50, "sate," should read --state,--.
Column 16,
        line 14, "control let" should read --controller--;
        line 29, "control let" should read --controller--; and
        line 45, "charge the," should read --charge, the--.
Column 4, line 26, after " that " delete the comma ",".

UNITED STATES PATENT AND TRADEMARK OFFICE
CERTIFICATE OF CORRECTION

PATENT NO. : 5,512,929
DATED : April 30, 1996
INVENTOR(S) : YOJI SERIZAWA, ET AL.

It is certified that error appears in the above-indentified patent and that said Letters Patent is hereby corrected as shown below:

Column 18,
    line 31, "electrographic" should read --electrophotographic--.
Column 19,
    line 19, "operation" should read --operation,--.

Signed and Sealed this

Twenty-ninth Day of October 1996

Attest:

BRUCE LEHMAN

Attesting Officer       Commissioner of Patents and Trademarks